US005343397A

United States Patent [19]
Yoshino et al.

[11] Patent Number: 5,343,397
[45] Date of Patent: Aug. 30, 1994

[54] SYSTEM FOR CONTROLLING LOCOMOTION OF LEGGED WALKING ROBOT

[75] Inventors: Ryutaro Yoshino; Hideo Takahashi, both of Saitama, Japan

[73] Assignee: Honda Giken Kogyo Kabushiki Kaisha, Tokyo, Japan

[21] Appl. No.: 766,629

[22] Filed: Sep. 26, 1991

[30] Foreign Application Priority Data

Sep. 28, 1990 [JP] Japan .................................. 2-259839

[51] Int. Cl.$^5$ ............................................ B62D 57/02
[52] U.S. Cl. .................... 364/424.02; 901/1; 280/8.1; 280/8.4; 318/568.2; 318/568.16
[58] Field of Search ................. 180/8.1, 8.2, 8.3, 8.4, 180/8.5, 8.6; 364/513, 424.02; 318/568.2, 568.16, 568.11; 378/568; 901/1

[56] References Cited

U.S. PATENT DOCUMENTS

| | | | |
|---|---|---|---|
| 4,834,200 | 5/1989 | Kajita | 901/1 |
| 4,868,472 | 9/1989 | Daggett | 318/568.2 |
| 4,908,556 | 3/1990 | Daggett et al. | 318/568.2 |
| 4,985,668 | 1/1991 | Nakazumi et al. | 318/568.2 |
| 5,049,797 | 9/1991 | Phillips | 318/568.16 |
| 5,144,211 | 9/1992 | Daggett et al. | 318/568.11 |
| 5,151,859 | 9/1992 | Yoshino et al. | 364/424.02 |
| 5,159,988 | 11/1992 | Gomi et al. | 180/8.6 |

FOREIGN PATENT DOCUMENTS 0406018  1/1991  European Pat. Off. .

OTHER PUBLICATIONS

Yoshie Sasaki, "Walking Stability Controlling System of Multi-Articulated Walking Robot", *Patent Abstracts of Japan*, vol. 12, Feb. 3, 1988, p. 664.
Yoshie Kitagawa, "Controller for Articulated Walking Robot," *Patent Abstracts of Japan*, vol. 11, Oct. 6, 1987, p. 623.
Ichiro Kato et al;, "Development of the Legged Walking Robot", *Hitachi Review* vol. 36 (1987) Apr. No. 2, pp. 71–78.
Michael C. Mulder et al, "Dynamic Stability in Bipedal Motion: Adaptive Control Strategies for Balance and Controlled Motion", *Robotics & Computer Integrated Manufacturing*, vol. 7 No. 3/4, 1990 pp. 345-355.
J. Furusho et al, "Sensor-Based Control of a Nine-Link Biped", *The International Journal of Robotics Research*, vol. 9, No. 2, Apr. 1990 pp. 83–98.

*Primary Examiner*—Thomas G. Black
*Assistant Examiner*—Julie D. Day
*Attorney, Agent, or Firm*—Lyon & Lyon

[57] ABSTRACT

A system for controlling locomotion of a biped walking robot. The system carries out feedback control for eliminating the deviation between a target value and the detected angle of inclination of the linkage mechanism in the absolute coordinate system. Hence, stable dynamic walking is achieved at all times even during locomotion over rough terrain. In the stability control, the number of joints with respect to which control is conducted is reduced to the minimum required and control is conducted separately but in coordination with respect to the movement or motion in the pitch direction and the movement or motion in the roll direction, while the remaining joints are controlled locally. Thus, the control is considerably simplified. In addition, feedback control is conducted with respect to the velocity components so as to realize the desired posture angles and the feedback gain adjusted so as to achieve the response speed required by the individual linkages. This further enhances the capability of the robot to walk stably at high speed.

21 Claims, 23 Drawing Sheets

FIG.4
FIG.5
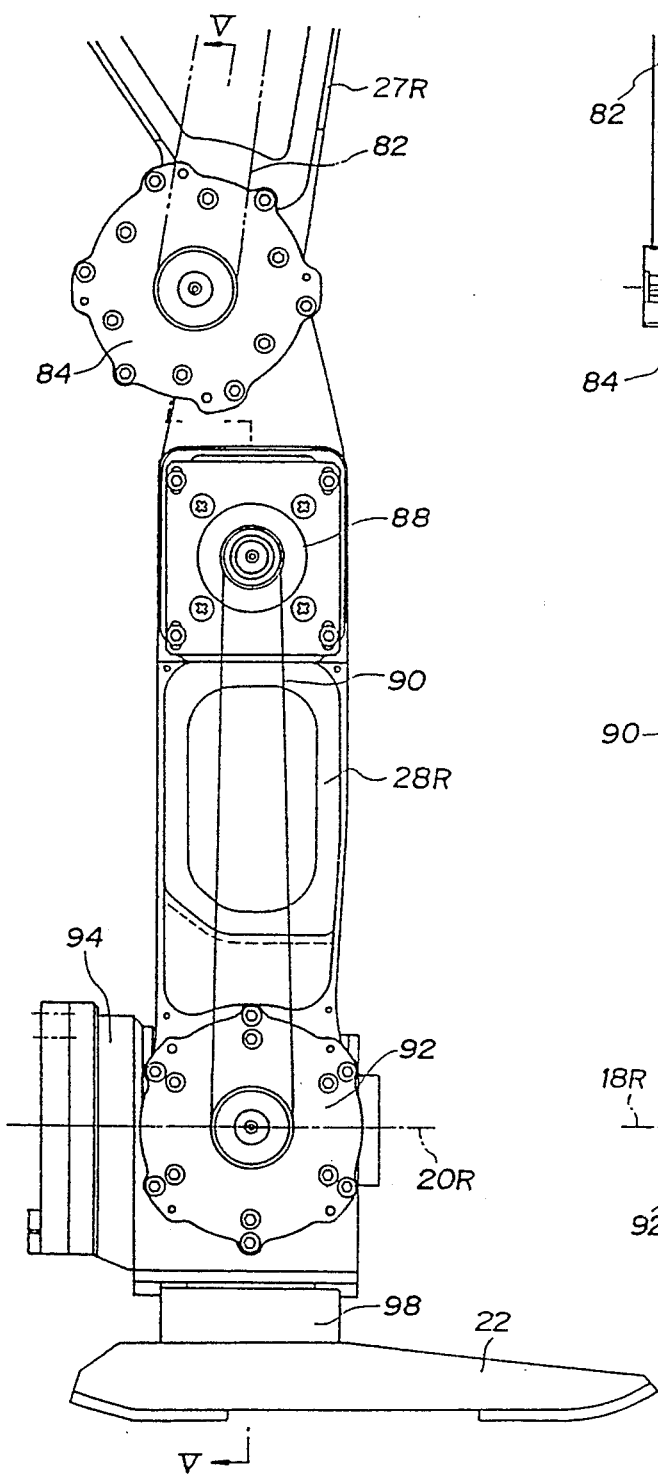
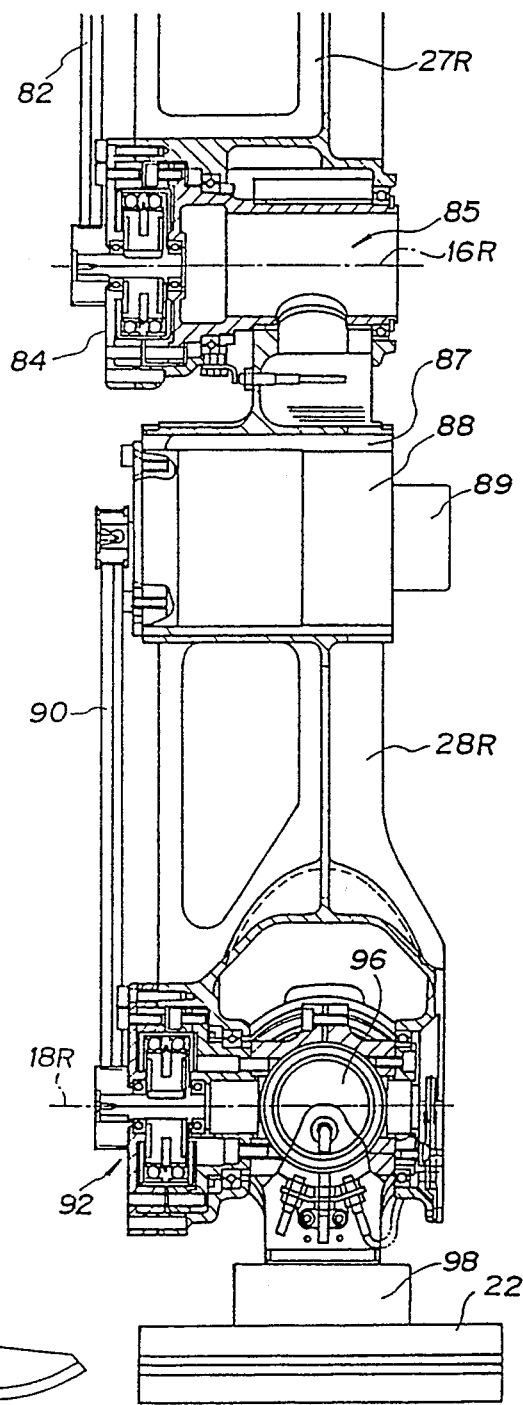

SYSTEM FOR CONTROLLING LOCOMOTION OF LEGGED WALKING ROBOT

BACKGROUND OF THE INVENTION

1. Field of the Invention

This invention relates to a system for controlling the locomotion of a legged walking robot and, more particularly, to a system for controlling the locomotion of a legged walking robot which enables a biped walking robot to walk stably over irregular terrain.

2. Description of the Prior Art

For increasing the walking speed and reducing the energy consumption of a biped walking robot, it is necessary to abandon static locomotion in which the center of gravity of the system is constantly at the bottom of the foot of the supporting leg in favor of dynamic locomotion utilizing inertial momentum. Examples of dynamic locomotion of a biped walking robot giving attention to this point can be found in a magazine titled "Journal of the Robotics Society of Japan", vol. 3, No. 4 (August, 1985).

The techniques discussed in the journal are, however, premised on the assumption of a disturbance-free, flat terrain and are not capable of achieving dynamic locomotion over a terrain that is irregular or stepped.

While walking over rough terrain or climbing a step, a biped walking robot tends to become most unstable during times when it is supported by one leg. Any attempt to secure greater stability solely by adjusting the size of the feet will have the undesired effect of reducing the robot's terrain adaptability and reducing its walking speed. While performance in these respects can be improved by enlarging the foot bottom area, this is not a wise expedient when considered from the point of the increases in weight and ground contact area this leads to.

SUMMARY OF THE INVENTION

The first object of the invention is therefore to provide a system for controlling the locomotion of a legged walking robot for enabling the robot to constantly maintain a stable posture during dynamic walking over irregular or stepped terrain.

With this respect, as pointed out in a magazine titled "Computrol" No. 9 (January, 1985), there have been proposed techniques for stably controlling the locomotion of a biped walking robot based on analysis of the robots dynamic characteristics through the use of state equations.

As these techniques are aimed at stabilization through centralized control based on a model encompassing all of the robot's joints, the control becomes highly complicated.

The second object of the invention is therefore to provide a system for controlling the locomotion of a legged walking robot which overcomes the foregoing shortcomings of the prior art by dividing the robot's joints into groups so as to simplify the model and thus make it easier to achieve stable control.

While it is desirable to reduce the weight of a biped walking robot, weight reduction inevitably leads to decreased rigidity. Where feedback control is employed for posture stabilization, the loss of rigidity can be compensated for by increasing the feedback gain. However, this sometimes leads to vibration owing to the elasticity in the vicinity of the joints affects affecting the movement of the linkages. Vibration also sometimes occurs in the actuators when the gain is increased as a result of mechanical chattering of the robot mechanisms, looseness in the drive belts and the like.

The third object of the invention is therefore to provide a system for controlling the locomotion of a legged walking robot which effectively suppresses vibration of the robot system even when the feedback gain is set at a relatively high level in order to increase the response speed of the control system during stability control.

This invention achieves this object by providing a system for controlling locomotion of a legged walking robot having a linkage made up of a body link and a plurality of leg links each connected to the body link through a drive Joint. The system comprises means for detecting absolute angle and/or angular velocity of the linkage in the absolute coordinates, means for establishing a target angle and/or angular velocity of the linkage and means for determining a control value of the drive joint in response to a deviation between the detected value and the target value such that the deviation decreases.

BRIEF EXPLANATION OF THE DRAWINGS

These and other objects and advantages of the invention will be more apparent from the following description and drawings, in which:

FIG. 4 is a side view and shows the arrangement from the knee on down of the robot illustrated schematically in FIG. 1;

FIG. 5 is a view similar to FIG. 4, but is viewed from line V—V of FIG. 4;

PREFERRED EMBODIMENTS OF THE INVENTION

Figure 1:
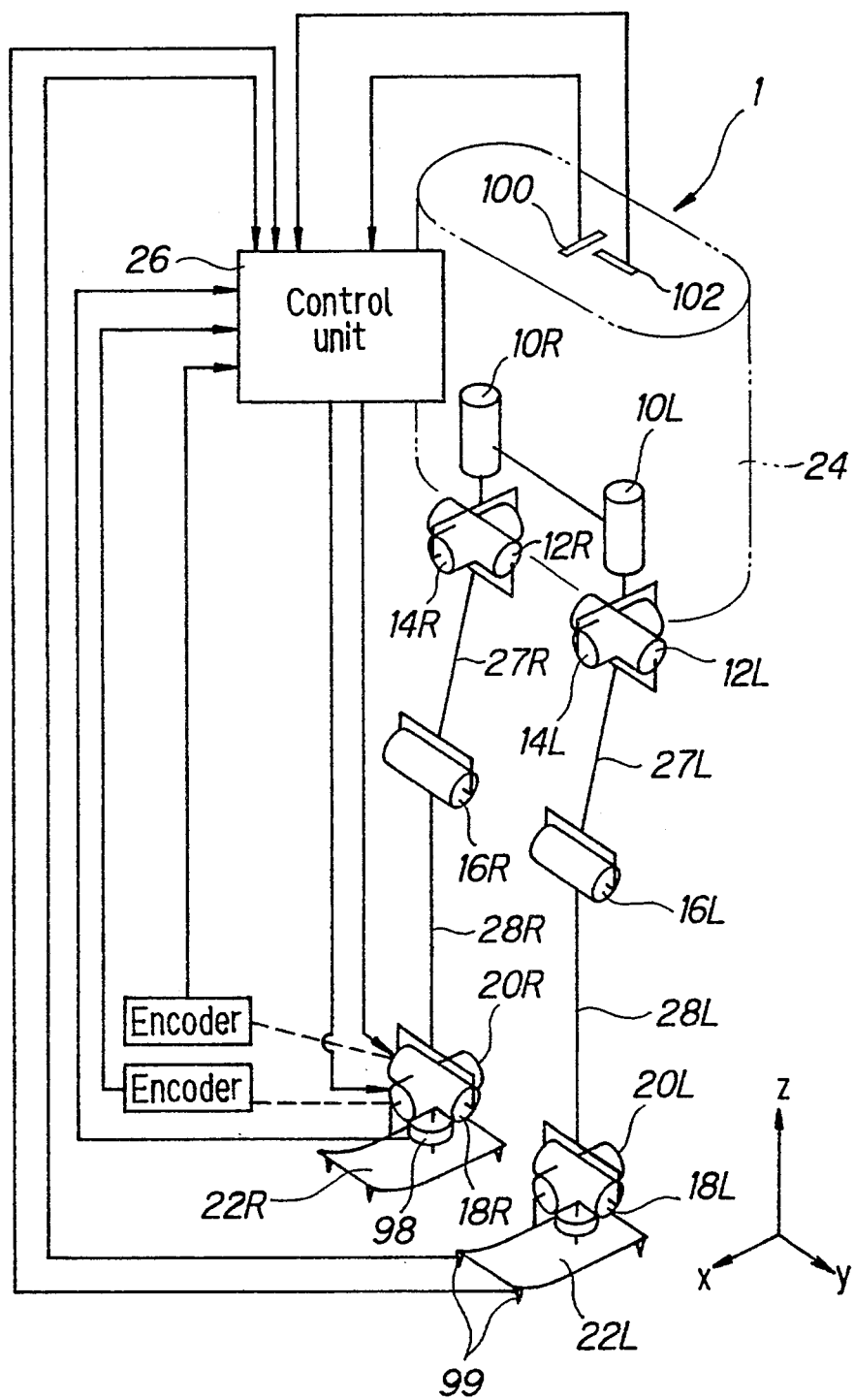
FIG. 1 is an overall skeleton view of a biped walking robot according to the present invention.

The invention will now be explained with reference to a biped walking robot as a specific embodiment of a legged walking robot. An overall skeleton view of the biped walking robot is shown in FIG. 1. The robot, designated by reference numeral 1, is provided with six joints (axes) on each of its right (R) and left (L) legs. From the top down, these joints (axes) are hip turning Joints (axes) 10R, 10L, hip pitch direction joints (axes) 12R, 12L, hip roll direction Joints (axes) 14R, 14L, knee pitch direction joints (axes) 16R, 16L, ankle pitch direction Joints (axes) 18R, 18L, and ankle roll direction Joints (axes) 20R, 20L. Feet 22R, 22L are attached below and a body 24 is disposed at the uppermost position. In this arrangement, joints (axes) 10R (L), 12R (L) and 14R (L) together constitute a right (left) hip joint, and joints (axes) 18R (L) and 20R (L) together form a right (left) ankle. The hip joints and the knees are connected by thigh links 27R, 27L and the knees and ankles are connected by crus links 28R, 28L.

Figure 2:
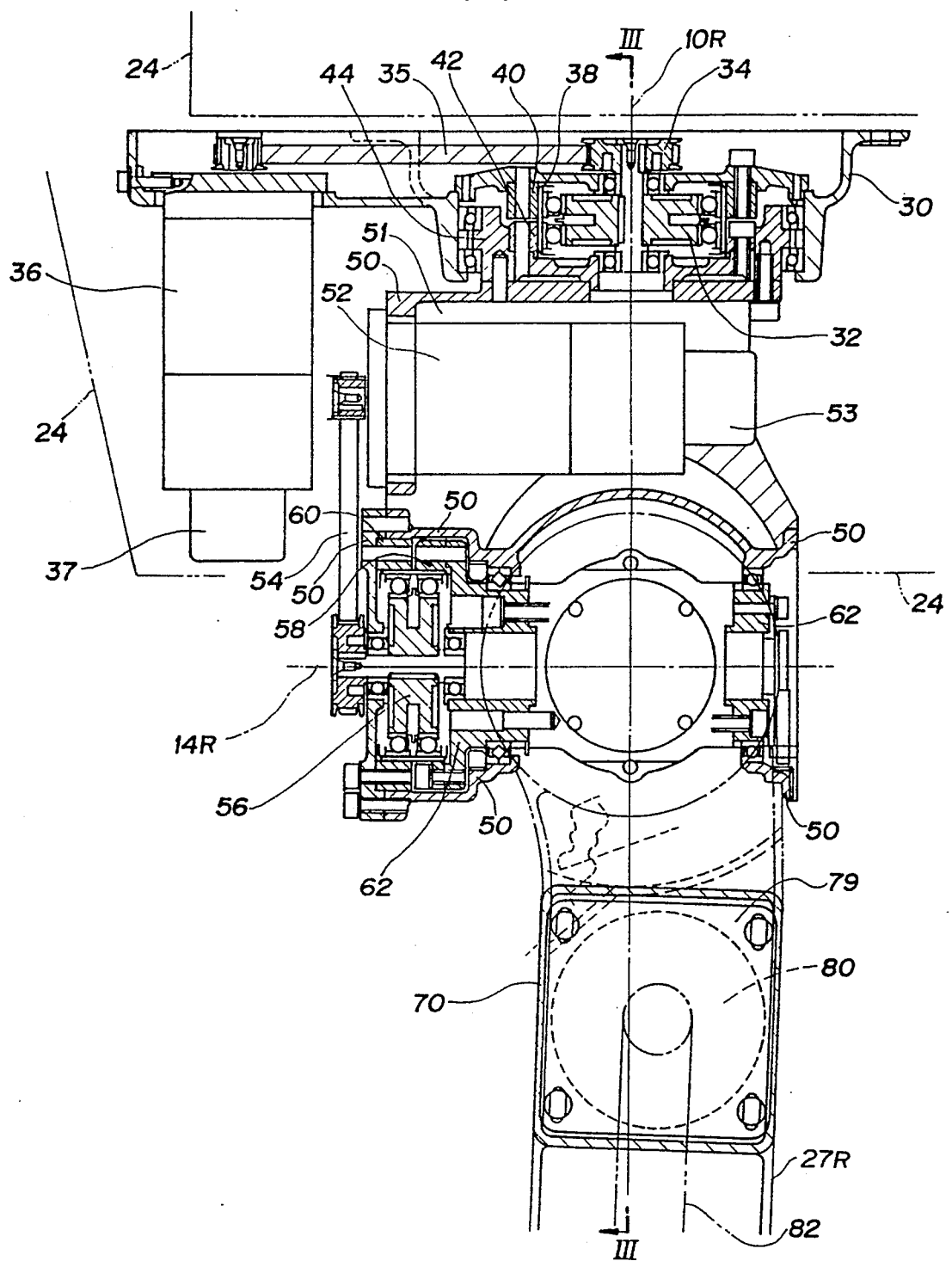
FIG. 2 is a detailed sectional view of the right hip Joint of the robot illustrated schematically in FIG. 1.
Figure 3:
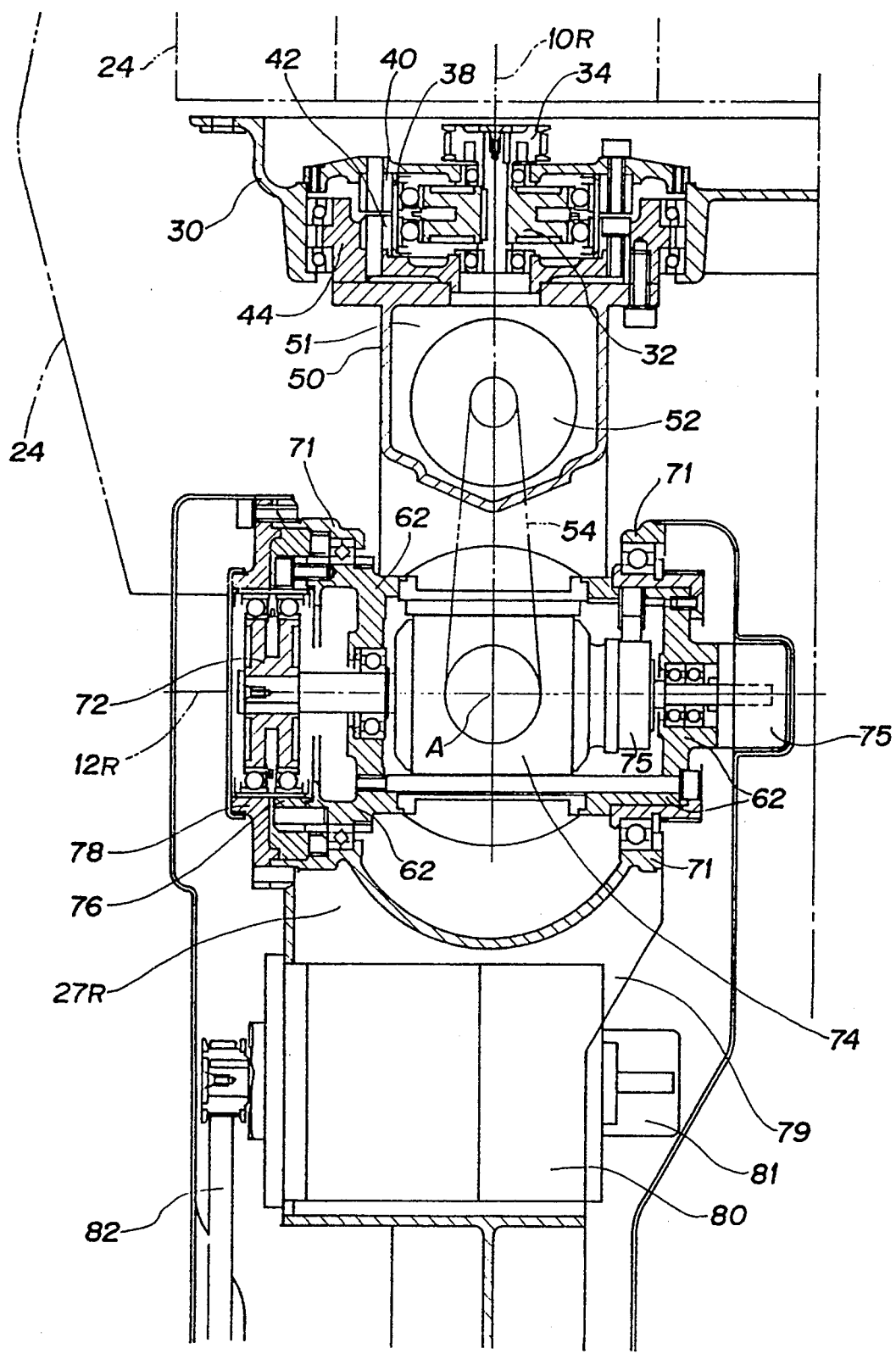
FIG. 3 is a sectional view taken along line III—III of FIG. 2.

FIGS. 2 and 3 show detailed sectional views of the right hip joint illustrated schematically in FIG. 1. As shown in FIG. 2, the body 24 is mounted on a pelvic plate 30 analogous to the human pelvis. The left and right legs are connected by the pelvic plate 30 and constitute the locomotion means of the robot. As indicated in FIG. 1, the legs, including the hip joints, are laterally symmetrical. Only the right leg will be explained in the following.

Referring to FIG. 2, a first Harmonic Reduction Gear (tradename) 32 is disposed at an inward part of the pelvic plate 30. A pulley 34 fixed on the input shaft of the first reduction gear 32 is driven by a first motor 36 via a belt 35. Rotation of the input shaft of the first reduction gear 32 causes relative movement among a flex ring 38, a fixed ring 40 and an output ring 42 thereof so as to reduce the rotation of the first motor 36. The manner in which this reduction occurs is well known and will not be gone into here. Since the fixed ring 40 is bolted to the pelvic plate 30 and the output ring 42 is bolted to an output member 44, the rotational output of the first motor 36 causes the pelvic plate 30 and the output member 44 to rotate relative to each other about the joint axis 10R.

A first yoke member 50 is bolted to the lower part of the output member 44. The upper part of the first yoke member 50 is formed to have a cavity 51 for accommodating a laterally oriented second motor 52. The output of the second motor 52 is transmitted via a belt 54 to a second Harmonic Reduction Gear 56 located beneath the second motor. The second reduction gear 56 reduces the speed and increases the power of the rotational motion input thereto and applies it for driving an output ring 58. The fixed ring 60 of the second reduction gear 56 is bolted to the bottom left side of the first yoke member 50, and the output ring 58 is fixed via an output member 62 to the upper end of the thigh link 27R located below the first yoke member 50. As a result, the first yoke member 50 and the thigh link 27R are rotated relative to each other by the rotation of the second motor 52 so as to rotate the thigh link 27R about the aforesaid roll direction axis 14R. The bottom right of the first yoke member 50 is formed as a bearing member which supports the thigh link 27R in cooperation with the output member 62.

As shown in FIG. 3, the upper portion of the thigh link 27R constitutes a second yoke member 71 at which a third Harmonic Reduction Gear 72 and a third motor 74 for directly inputting torque thereto are disposed laterally in a serial arrangement between the left and right sides of the yoke. The fixed ring 76 of the third reduction gear 72 is coupled with the output member 62 and the output ring 78 thereof is coupled with the second yoke member 71, whereby operation of the third motor 74 causes the output men, her 62 and the second yoke member 71 to rotate relative to each other so as to rotate the thigh link 27R around the pitch direction axis 12R. As shown, the axes 10R, 12R and 14R intersect perpendicularly at point A (FIG. 3). Angular positions can therefore be calculated by conversion within an orthogonal coordinate system.

The arrangement of the knee will now be explained. As shown in FIG. 2, the thigh link 27R is formed at its upper end with a recess 79 accommodating a fourth motor 80 whose output is transmitted downward to the knee. Turning to FIGS. 4 and 5, which show the arrangement from the knee on down, the output of the fourth motor 80 is input via a belt 82 to a fourth Harmonic Reduction Gear 84 mounted at the knee (axis) 16R. (For weight reduction, the interior of the knee 16R is formed with a cavity 85.)

The knee (axis) 16R and the ankle are connected via a crus link 28R formed at its upper end with a recess 87 accommodating a fifth motor 88. The output of the fifth motor 88 is input, via a belt 90, to a fifth Harmonic Reduction Gear 92 provided at the ankle, whereby a foot 22 is driven in the pitch direction about the axis 18R. The foot is further arranged to swing freely about the axis 20R perpendicularly intersecting the axis 18R. For this purpose, there is provided a sixth Harmonic Reduction Gear 94 and a sixth motor 96 for supplying power directly thereto.

The motors 36, 52, 74, 80 and 88 are respectively provided with rotary (shaft) encoders 37, 53, 75, 81 and 89. The sixth motor 96 is also provided with a rotary encoder, but it is not shown in the figures. These encoders detect the respective motor rotation angles. The ankle is further provided with a six-dimensional force and torque sensor 98 for measuring the applied load and the like so as to make it possible to determine whether the leg concerned is the free leg or the supporting leg. For detecting contact with the ground, the four corners of the foot bottom are provided ground contact switches 99 of known design (not shown in FIGS. 4 and 5). As shown in FIG. 1, a pair of inclination angle sensors 100, 102 are provided at an appropriate location on the body 24 for detecting (a) the amount of angle and angular velocity of the inclination relative to the z-axis in the x-z plane and (b) the amount of angle and angular velocity of the inclination relative to the z-axis in the y-z plane. Movement or motion in the x-z plane, i.e. movement or motion in the fore and back directions is defined as pitch movement and movement or motion in the y-z plane, i.e. movement or motion in the left and right directions as roll movement. The outputs of the inclination angle sensors 100, 102 are sent to a control unit 26 housed in the body 24.

Figure 6:
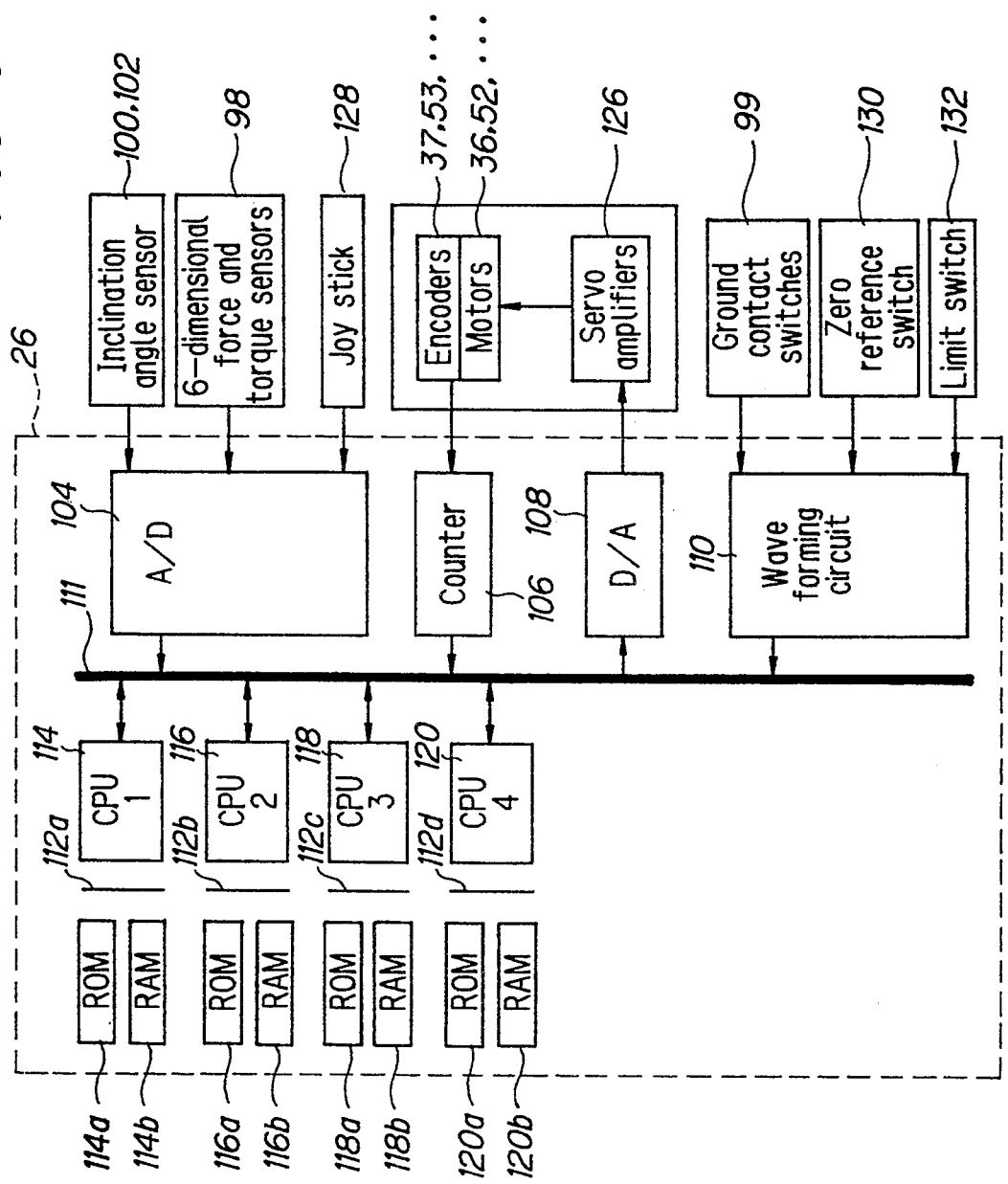
FIG. 6 is a detailed block diagram of the control unit shown in FIG. 1.

As shown in the detailed block diagram of FIG. 6, the control unit 26 has an A/D converter 104, a counter 106, a D/A convertor 108, a wave forming circuit 110 and four central processing units (CPUs) 114, 116, 118 and 120 connected therewith by a common bus 111. The four CPUs are respectively connected with read only memories (ROMs) 114a, 116a, 118a, 120a and random access memories (RAMs) 114b, 116b, 118b, 120b via local buses 112a, b, c, d.

Analog outputs from the sensors 100, 102 and the like are forwarded to the A/D converter 104 within the control unit 26 for conversion to digital values. On the other hand, the output of the encoders 37, 53, . . . , are sent to the counter 106 for counting the number of output pulses, while the digital outputs from the ground contact switches 99 and the like are applied to the wave forming circuit 110 for waveforming. These detected values are appropriately input to the RAMs of the CPUs 114, 116, 118 and 120. As will be explained in detail later, the CPUs use the detected values for calculating control values which are forwarded via the D/A convertor 108 to servo amplifiers 126 where they are converted to current values that are supplied to the motors 36, 52, . . . . Reference numeral 128 designates a joy stick, 130 a zero reference switch for determining the origin (upright) posture, and 132 a limit switch for preventing overrun.

Figure 7:
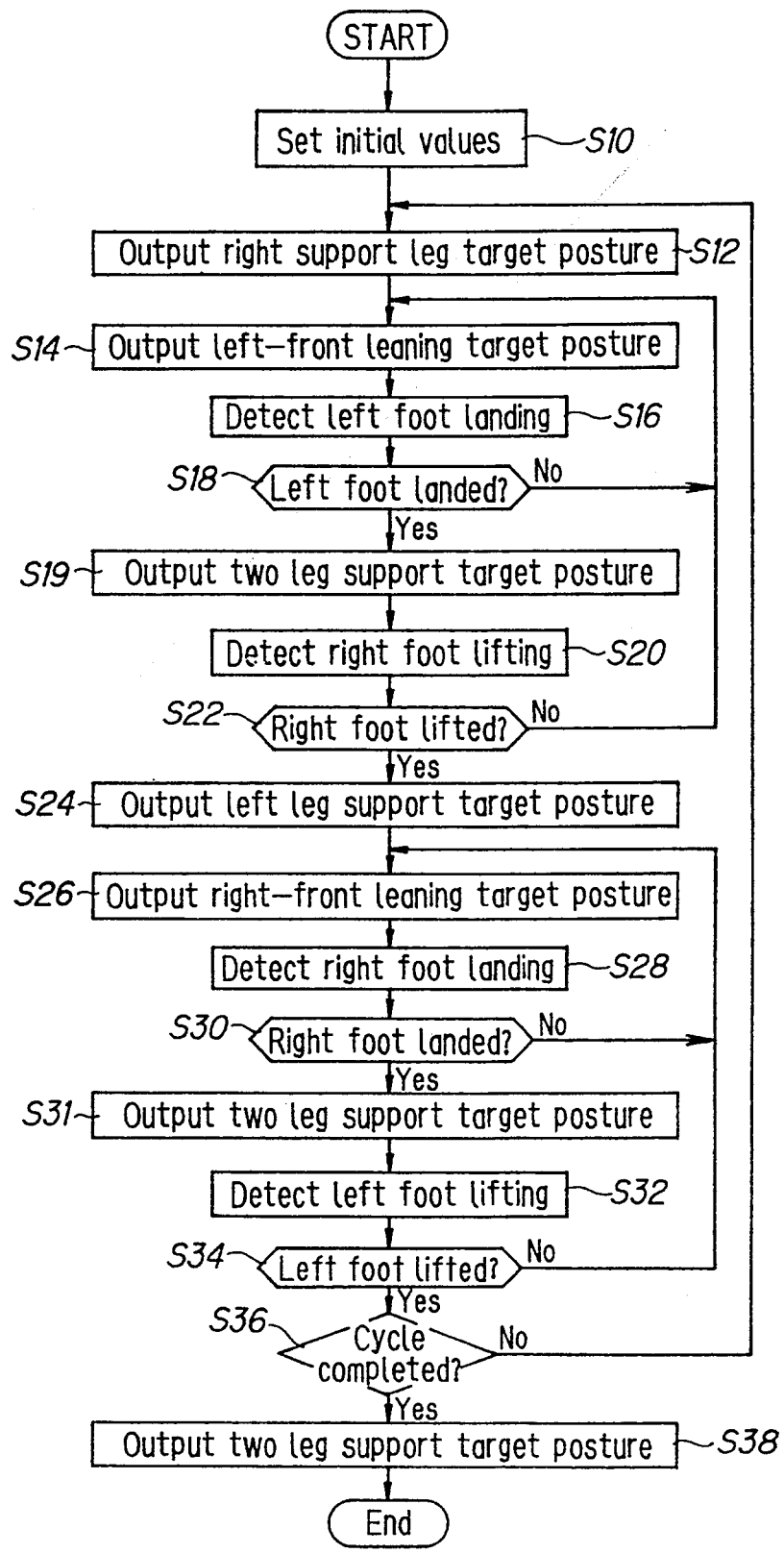
FIG. 7 is a flowchart showing the operation of the control unit, more specifically showing the operation of the subsystem 1 which will be referred in FIG. 11.
Figure 8:
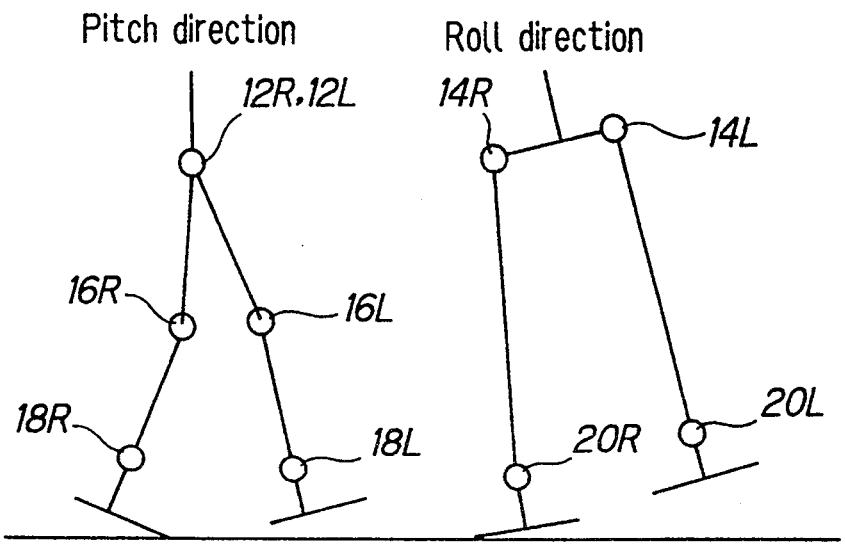
FIG. 8 is an explanatory view showing which joints are used in the robot for walking in the pitch direction (the forward and backward directions) and the roll direction (the left and right directions)

FIG. 7 is a flowchart showing the operation of the control unit. Before going into an explanation based on this figure, the control according to the invention will be explained in general terms. In the robot 1 of the structure shown in FIG. 1, it is possible, as shown in FIG. 8, to divide the axes into those at which mainly pitch movement or motion (movement or motion in the pitch direction) is controlled and those at which mainly roll movement or motion (movement or motion in the roll direction) is controlled. In the control according to this invention, therefore, the joint movement is divided into pitch movement and roll movement and stabilized walking is realized through control coordinating these two types of movement. Moreover, as will be touched on again later, the detection of angles and angular velocities is carried out using absolute angles and absolute angular velocities with respect to the force of gravity.

As also shown in FIG. 8, similar to what is observed in human walking, the amount of movement or motion of the knee 16R of the supporting leg is slight during walking over flat terrain. On the other hand, the amount of movement of the knee 16L of the free leg is large but since the mass below the knee is small, the effect on the overall movement is small. The effect of the ankle movement is also small. From these facts, it can be concluded that in controlling pitch movement during walking over smooth ground, only control of three axes, the ankle axis 18R of the supporting leg and the hip axes 12R and 12L, need be considered. At this time, it suffices to control only the joint angles of the knees 16R and 16L and the ankle 18L of the free leg only to the degree required for coordination with the movement of the first-mentioned three joints (axes). The case is similar as regards control of roll movement. Only control of the ankle 20R of the supporting leg and the hip axes 14R and 14L need be considered, while control of the ankle 20L of the free leg can be limited to that for coordination with these three joints (axes).

Figure 9:
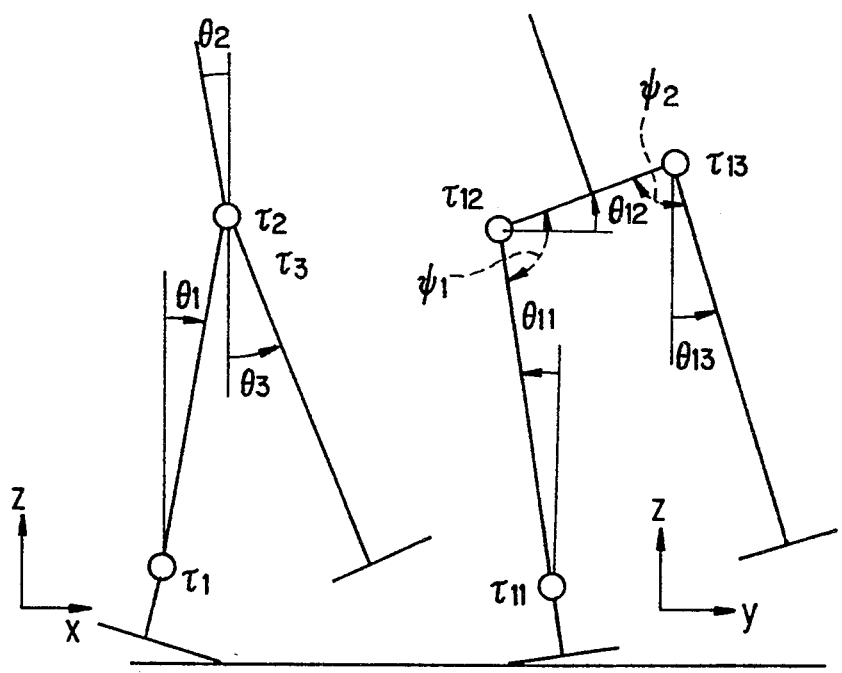
FIG. 9 is an explanatory view for modeling the robot motion state as expressed in the state equation for feedback control.

From the foregoing observations, the pitch and roll motions of a biped walking can be modeled as shown in FIG. 9. Defining the upright posture as "normal" so as to simplify the control, the following relationships hold when this posture is modeled using line approximations of linear type:

Motion in the pitch direction:

$$\ddot{\theta}s = As\theta s + BsTs \qquad (1)$$

where linkage angle $$\Theta s = \begin{pmatrix} \theta 1 \\ \theta 2 \\ \theta 3 \end{pmatrix} \quad \text{Torque } Ts = \begin{pmatrix} \tau 1 \\ \tau 2 \\ \tau 3 \end{pmatrix}$$

*As, Bs*: Constants (3 × 3 matrix)

Motion is the roll direction:

$$\ddot{\theta}f = Af\theta f + BfTf + Df \qquad (2)$$

where linkage angle $$\Theta f = \begin{pmatrix} \theta 11 \\ \theta 12 \\ \theta 13 \end{pmatrix} \quad \text{torque } Tf = \begin{pmatrix} \tau 11 \\ \tau 12 \\ \tau 13 \end{pmatrix}$$

*Af, Bf*: Constants (3 × 3 matrix)
*Df*: Constant (3 × 1 matrix)

In general, motions in the pitch and roll directions can be expressed as follows:

$$\ddot{\theta} = A\theta + BT + D \qquad (3)$$

where,
in case of pitch; D=0
in case of roll; D: constant (3×1 matrix)

Since Eq. (3) as written above includes no damping term proportional to the angular velocity, the movement models expressible by this equation are unstable, making it impossible to maintain the target linkage angle (angle with respect to the absolute coordinates being used here) posture. Therefore, the following feedback control is conducted:

$$T = Hr\theta r + Hd - Fp\theta - Fv\dot{\theta} \qquad (4)$$

where
Hr: constant (3×3 matrix),

Hd: constant (3×1 matrix),
Fp,Fv: gain (3×3 matrix),
θr: absolute angle command value
When substituted into Eq. (3), this gives $$\ddot{\theta} = A\theta + B(Hr\theta r + Hd - Fp\theta - Fv\dot{\theta}) + D$$

$$\ddot{\theta} + BFv\dot{\theta} + (BFp - A)\theta - BHr\theta r - BHd - D = 0$$

Where $-B^{-1}D$ is substituted for Hd and $=B^{-1}(BFp-A)$ for Hr, there is obtained $$\ddot{\theta} + BFv\dot{\theta} + (A - BFp)(\theta r - \theta) = 0 \qquad (5)$$

Figure 10:
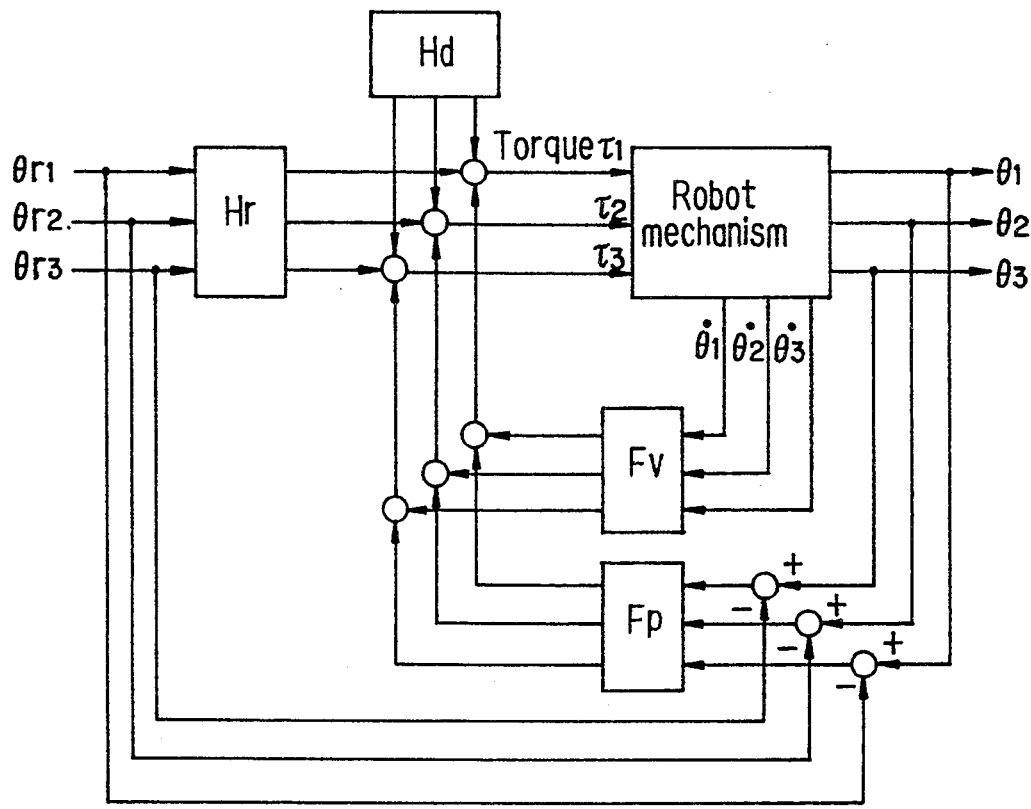
FIG. 10 is an explanatory view showing the feedback control based on the state equation in a block diagram.

When the gains Fv, Fp are appropriately set, the movement represented by Eq. (5) gradually converges on θr. The foregoing is illustrated in the block diagram of FIG. 10.

This diagram shows a stabilization algorithm for a specific walking posture (absolute command value θr constant) during the period of one-leg support. During walking, the absolute angle command value θr merely varies with time and fundamentally follows stably. While the control will be explained in detail with respect to the flowchart of FIG. 7, it can be grasped as a whole more easily from FIG. 11. Specifically, control according to the invention is carried out cooperatively by four subsystems. The four subsystems are constituted by the four CPUs shown in FIG. 6.

Figure 11:
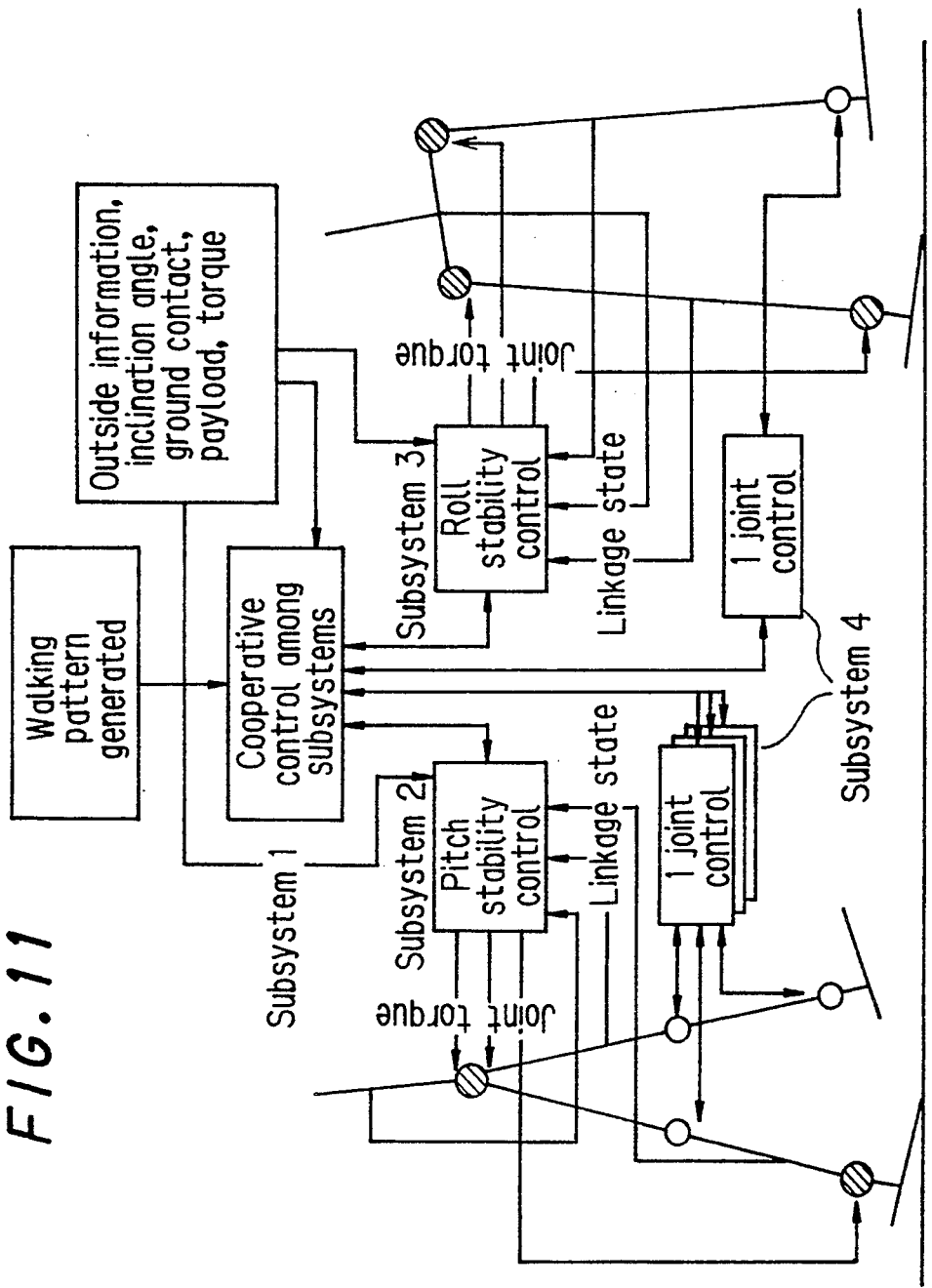
FIG. 11 is an explanatory view showing a characteristic feature of the control system according to the present invention, in which the control system is divided into four subsystems 1-4.

More specifically, subsystem 1 in FIG. 11 (CPU 114) receives a walking pattern (time series of postures) and varies the target posture as required based on the information from the outside such as inclination angles, ground contacting or the like and outputs the result to the subsystems 2-4 (CPUs 116, 118 and 120). The subsystems 2 and 3 carry out stability control for achieving the target posture, while the subsystem 4 carries out local control with respect to the joint that is not subjected to stability control.

The term "local control" here is used in contrast to the "state feedback control" indicated earlier by Eq. (4). Specifically, a concrete representation of Eq. (4) with respect to the pitch direction would be:

$$\tau i = hri1\ \theta 1r + hri2\ \theta 2r + hri3\ \theta 3r + \qquad (4)'$$
$$hdi - fpi1\ \theta 1 - fpi2\ \theta 2 - fpi3\ \theta 3 -$$
$$fvi1\ \dot{\theta}1 - fvi2\ \dot{\theta}2 - fvi3\ \dot{\theta}3$$

where i = 1,2,3 and provided that

| | |
|---|---|
| hrij: | element of matrix Hr |
| hdij: | element of matrix Hd |
| fpij: | element of matrix Fp |
| fvij: | element of matrix Fv |

In contrast to this, if, with respect to the knee of the free leg, for instance, the detected joint angle is assumed to be θk and the command value θkr, the joint torque τk can be calculated as follows:

$$\tau k = kp(\theta kr - \theta k) + Kv\dot{\theta}k \qquad (4)$$

In other words, as shown by Eq. (4)', the stability control conducted by the subsystems 2 and 3 is conducted by calculating the torque for each hip joint or ankle joint based not solely on angle (speed) information for that joint but on comprehensive information also including the angle (speed) information for the other joints. In contrast, in the knee torque calculation shogun by Eq. (4)", only angle (speed) information for the knee concerned is used. That is to say, the torque is controlled using only local information. It is in this sense that the control conducted by subsystem 4 is referred to as "local" in this specification.

As is clear from the foregoing, the present invention takes the view that the control would become extremely complex if all calculations were based on Eq. (4)' and to simplify the control, conducts comprehensive control of joint torque only at those joints which have a major effect on posture stability, while conducting local control of joint torque at the joint which has a relatively minor effect on posture stability. It should be noted, however, that even in local joint control, the command value is coordinated with the command values for the other Joints. While absolute angles (angular velocities) are used in the comprehensive control, relative angle (angular velocity) is used in local control.

The control system according to the invention will now be explained.

FIG. 7 is a flowchart of the operations performed by the subsystem 1 for producing a target posture output. The procedure begins with step 10 in which an appropriate initial value is set. At this time the torque value for the ankle joints 18R (L), 20R (L) is held within a prescribe range . The reason for this is that while the effective reactive force of the leg with respect to the ground required for realizing stable walking is borne mainly by the ankle torque on the supporting leg side, if this torque is too large it will have the adverse effect of causing the robot to spring upward. If this happens, the robot will not be able to maintain the proper posture. An upper limit is therefore placed on the ankle torque.

Figure 12:
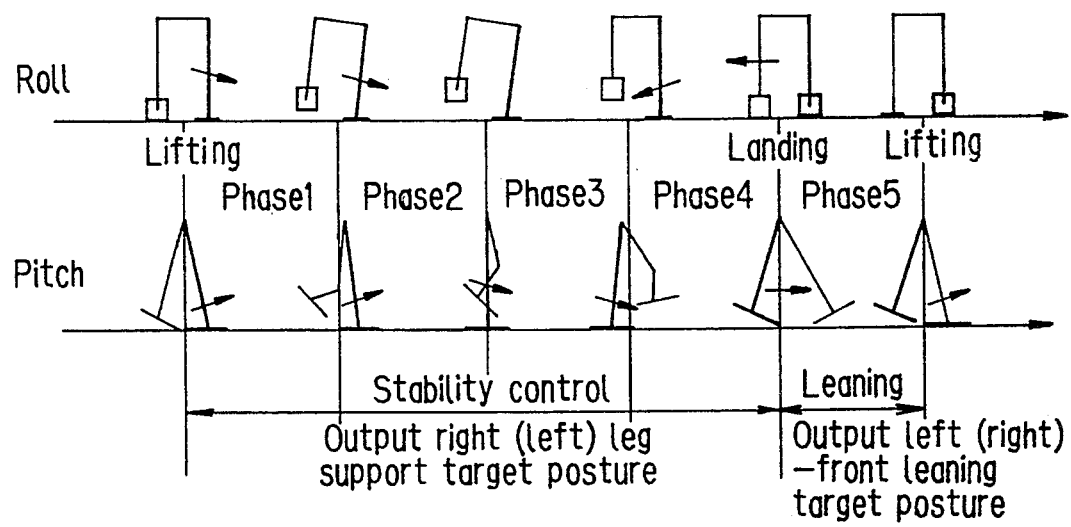
FIG. 12 is an explanatory view showing the walking motion of the robot viewed from the roll and pitch directions.

The procedure then moves to step S12 in which the right leg support target posture is output. Specifically, the time-series target postures of phases 1-3 in FIG. 12 are output to the respective subsystem. The subsystems 2-4 carry out stability and Joint angle control for obtaining the target posture. (While the flowchart begins with control for the case of starting from right leg support, the procedures also apply when starting from left leg support, except that "left" and "right" in the flowchart are reversed.) Moreover, as was explained with reference to step S10, jumping is prevented during the period of single leg support by putting an upper limit on the ankle torque.

The procedure then moves to step 14 in which a left-front leaning target posture is output. This corresponds to phase 4 in FIG. 12. In other words, for achieving dynamic walking, a target posture is set for moving the center of gravity to the left front in preparation for landing of the left foot. To prepare for the landing of the free foot at this time, the ankle torque is held below an upper limit for absorbing excessively large impact and a low-impact leaning target posture is output.

The landing state of the left foot is then detected in step S16.

Figure 13:
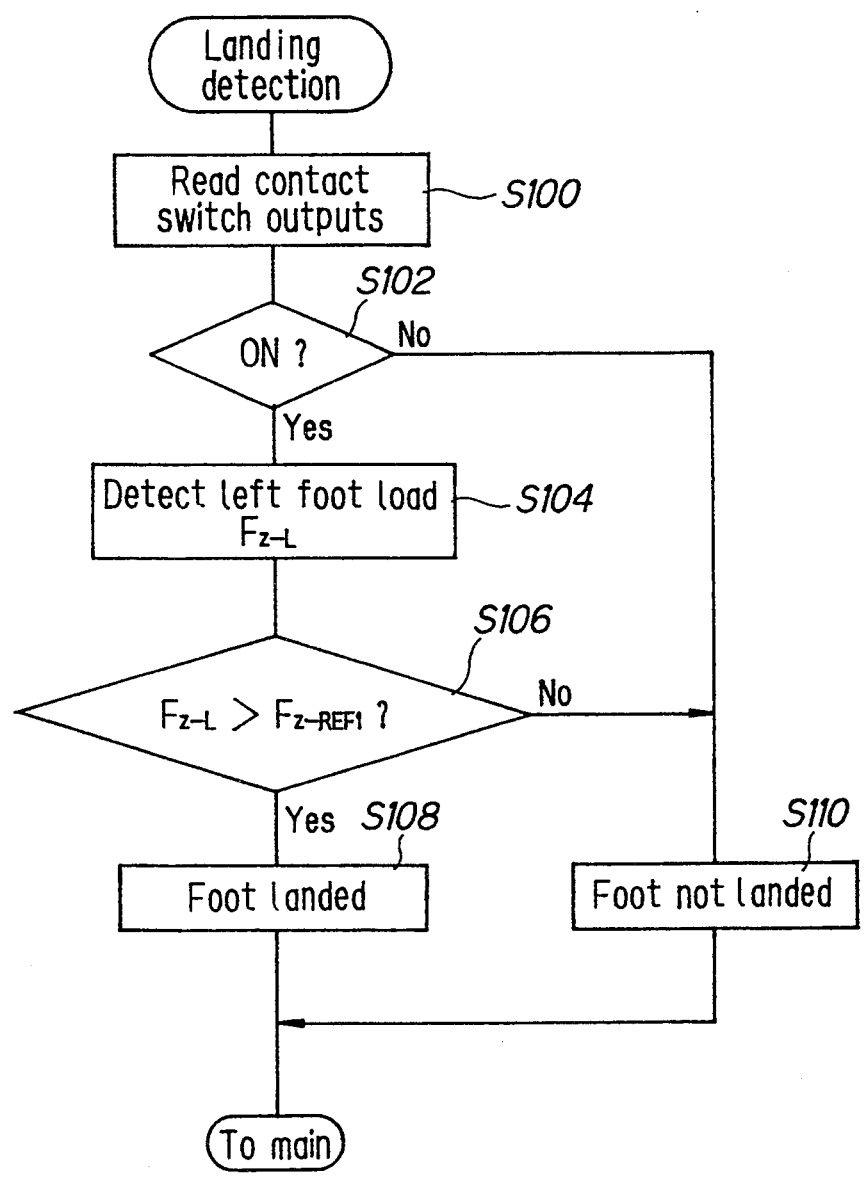
FIG. 13 is a flowchart showing a subroutine of FIG. 7 flowchart for detecting robot leg landing.

FIG. 13 shows a subroutine for this detection. First, the outputs of the ground contact switches (on the left foot side) are read in step S100 and if it is found in step S102 that any one among the switches is on, i.e. if contact is detected, the procedure advances to step S104 in which the left foot load Fz-L on the side concerned is detected from the output of the aforesaid six-dimensional force and torque sensor. The procedure then moves to step S106 in which the detected value is compared with an appropriately set reference value Fz-REF1 and if it exceeds this value, the procedure advances to step S108 in which it is found that landing has occurred. If the result in either of steps S102 or S106 is negative, the procedure goes to step S110 in which it is judged that the foot has not landed yet. Footfall (the event of placing or landing of a foot) is not judged merely by detection of contact based on the outputs of the ground contact switches but is judged to have occurred only when a load of larger than a prescribed magnitude has been received. As a result, it is possible to reliably determine which is supporting the weight of the robot.

Returning to FIG. 7, the procedure next moves to step S18 in which judgment is made on the basis of the conclusion reached in the subroutine as to whether or not the left foot has landed, and if it is found that it has, the procedure goes to step S19 in which a two-leg support target posture is output. Specifically, up to the time that footfall is judged to have occurred on the basis of the load in step S18, the output of the joint command value for the free leg linkage is continued so as to maintain a constant inclination with respect to the ground and the one-leg support posture output is continued up to the time that actual landing of the free foot has been detected from the load, notwithstanding that the free foot landing posture may have already been assumed. Thus, the inclination of the free leg linkage with respect to the ground stays constant in accordance with the command value and foot fall always occurs in the same posture, whereby the initial posture in the two-leg support period is substantially the same in every walking cycle. As a result, the footfall impact is also constant and transition to the two-leg support state can be stably achieved.

The procedure then advances to step S20 in which the footlift (the event of lifting a foot) state of the right foot is detected.

Figure 14:
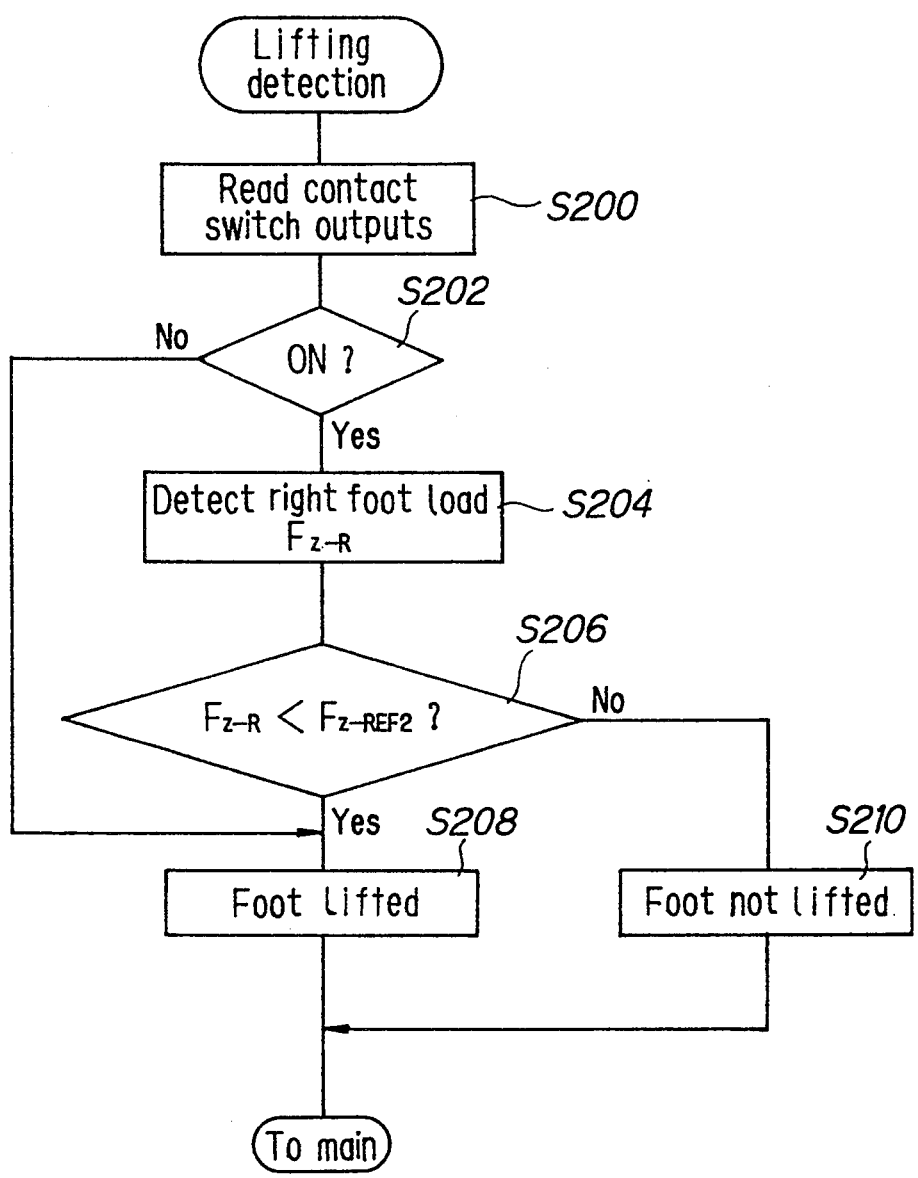
FIG. 14 is a flowchart showing a subroutine of FIG. 7 flowchart for detecting robot leg lifting.

FIG. 14 shows a subroutine for this detection. First, the output of the ground contact switches (on the right foot side) is received in step S200 and if it is found in step S202 that any one of the switches is on, i.e. if the foot is still in contact with the ground, the procedure advances to step S204 in which the right foot load Fz-R on the side concerned is read in. The procedure then moves to step S206 in which the detected value is compared with a second reference value Fz-REF2 and if it is smaller than this value, the procedure advances to step S208 in which it is deemed that footlift has occurred. If it is found, on the other hand, to be larger than the reference value, the procedure goes to step S210 in which it is deemed that no footlift has occurred. When it is found in step S202 that the switches are off, the procedure skips directly to step S208 where it is judged that footlift has occurred. Thus the judgment of footlift also does not rely solely on whether or not the foot is in contact with the ground and even though some contact may continue, footlift is judged to have occurred if the load has fallen below the prescribed value. It is thus possible to detect the state in which the robot is supporting its weight with greater precision.

Figure 15:
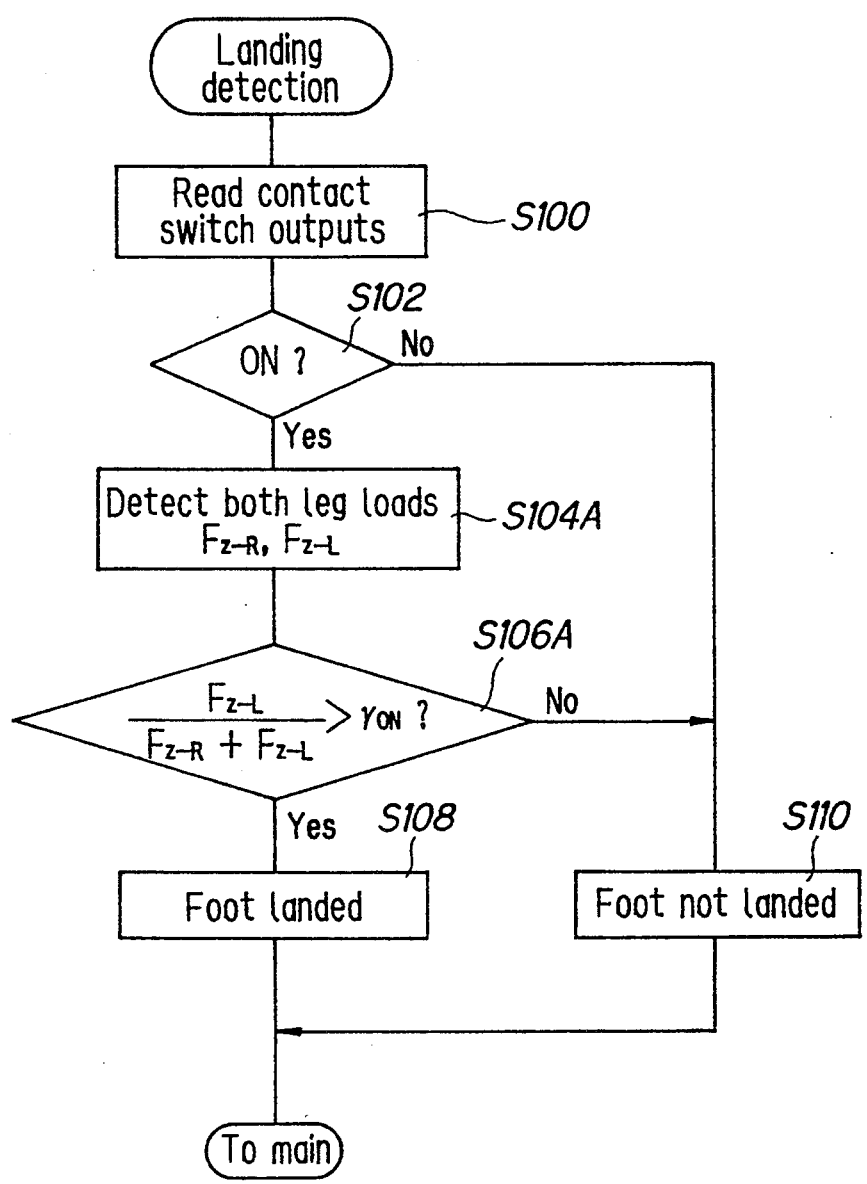
FIG. 15 is a view similar to FIG. 13 but shows another technique to detect robot leg landing.
Figure 16:
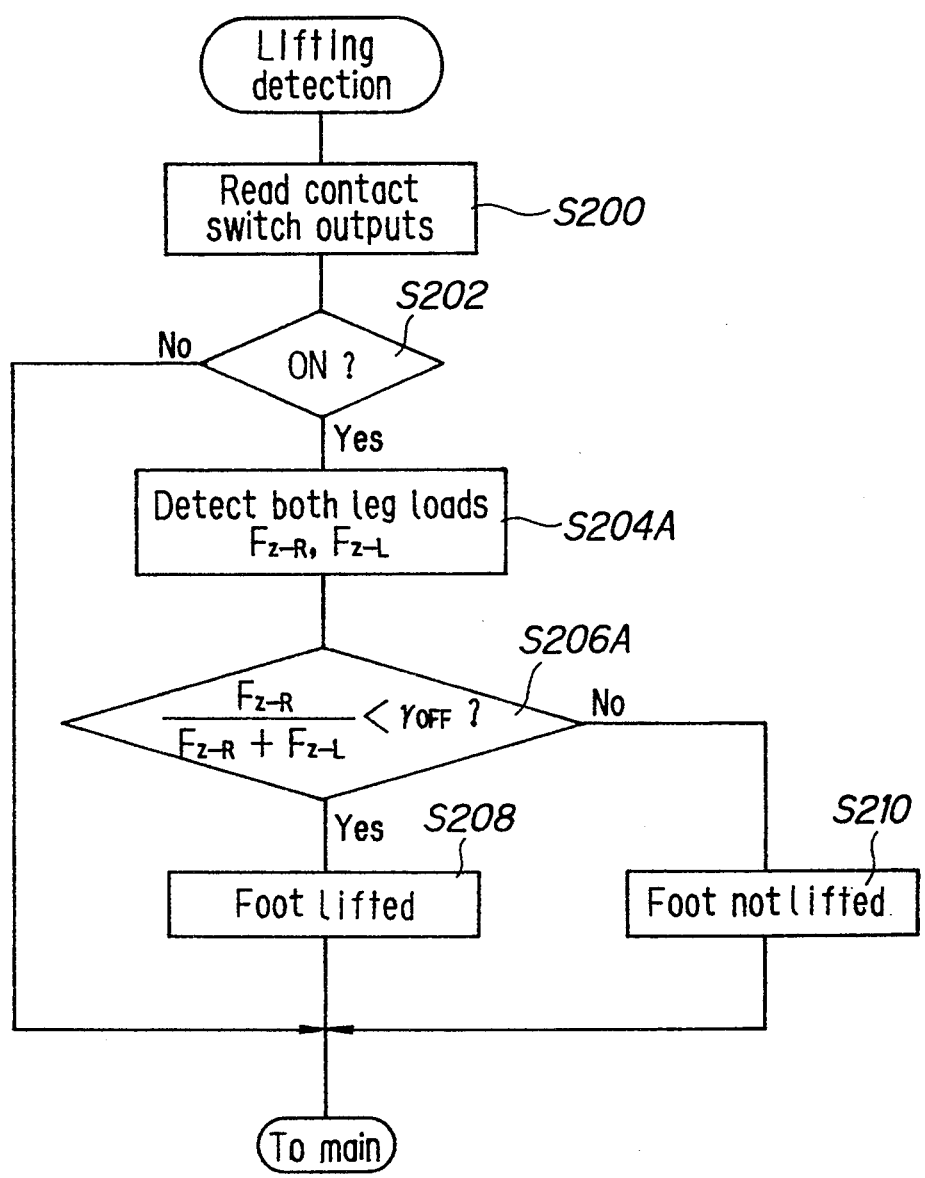
FIG. 16 is a view similar to FIG. 14 but shows another technique to detect robot leg lifting.

It is alternatively possible to judge footfall and footlift from the load ratio between the two legs. In the case of judging foot fall by this method the procedure shown in FIG. 15 is followed. Specifically, steps S104 and S106 of the flowchart of FIG. 13 are replaced by steps S104A and S106A. After both leg loads Fz-R and Fz--L have been read in step S104A, the procedure goes to step S106A in which the load of the foot with respect to which judgment is being made is divided by the sum of the loads of both feet and the quotient thus obtained is compared with an appropriately set reference value Gamma ON. If the quotient is larger than the reference value, it is judged that footfall has occurred. On the other hand, the procedure of FIG. 16 is followed for judging footlift. Specifically, steps S204 and S206 of FIG. 14 are replaced by steps S204A and S206A and a quotient obtained in the manner just explained is compared with another reference value Gamma OFF. If the quotient is smaller than the reference value, it is judged that footlift has occurred. When the foregoing arrangement is used, the weight of the robot can be normalized, thus enabling the judgments to be made irrespective of the size of any payload the robot may be bearing and also making it possible to increase immunity to sensor noise and the like. (The reference values Gamma ON and Gamma OFF are appropriately set between 0 and 1.)

Returning to FIG. 7, when it is found in step S22 that the right foot has been lifted, the procedure advances to step S24 in which the left leg support target posture is output. Specifically, once the right foot has left the ground and a left leg support state been established, the target posture for left leg support is output for posture stabilization. If the sequence here should be reversed, it might in some cases not be possible to produce effective torque in the supporting leg. Namely, the left leg becomes the supporting leg only after right footlift and so if the left leg support target posture is output before right footlift, the torque produced in the left ankle may cause the left foot, which is not bearing any weight at this time, to kick the ground and cause the robot to fall over. The sequence is established in the foregoing manner to preclude this possibility.

In the ensuing steps S26–S34 the same procedures are conducted with respect to the other leg. Then when it has been judged in step 36 that the walking cycle has been completed, the procedure moves to step S38 in which the two-leg support target posture is output. This concludes the routine.

Figure 17:
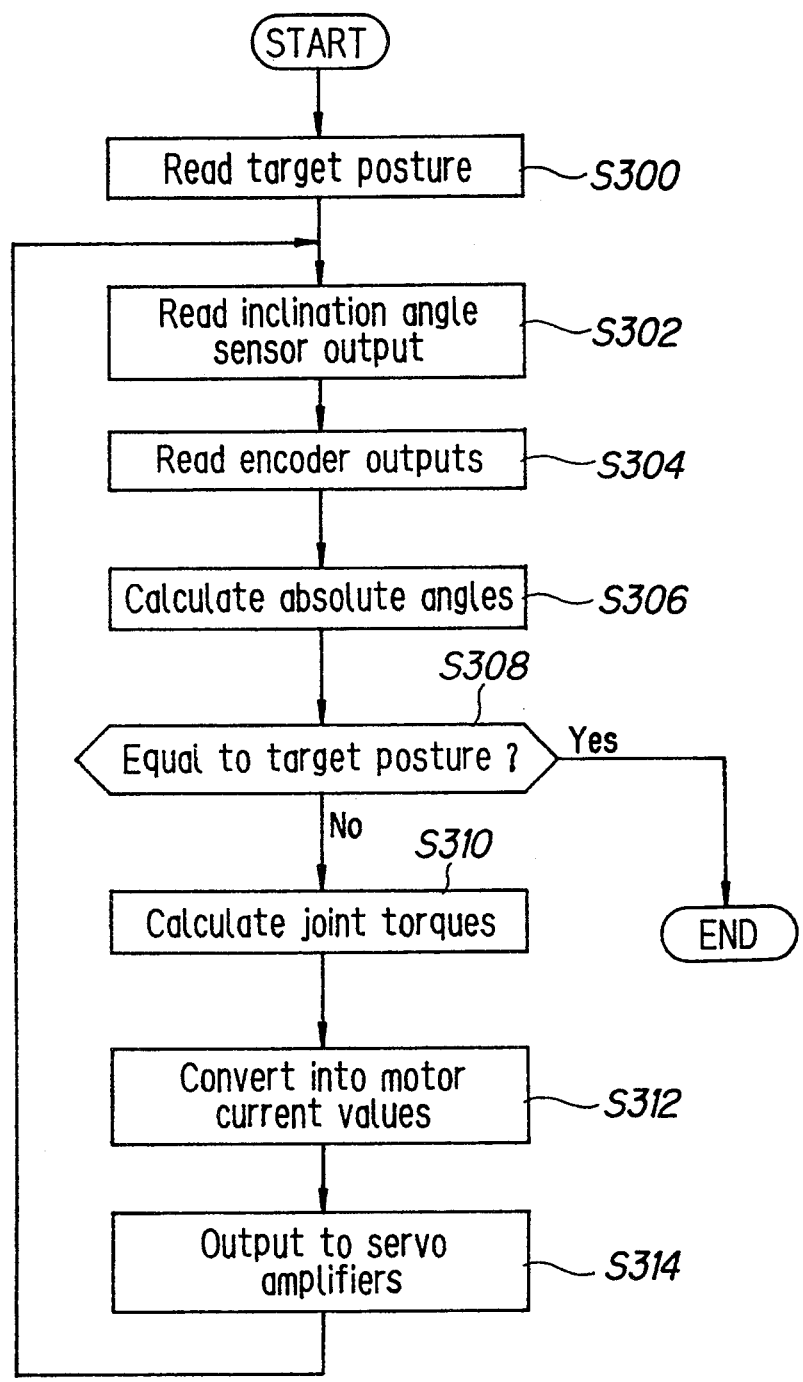
FIG. 17 is a flowchart showing the operation of the subsystems 2,3 illustrated in FIG. 11.

The control conducted by the subsystems 2 and 3 will now be explained with reference to the flowchart of FIG. 17. This control is for conducting stability control for realizing the target posture output based on the procedures just explained with reference to FIG. 7.

First, in step S300 input of the target posture is read in. This posture is expressed in terms of linkage angles.

Figure 18:
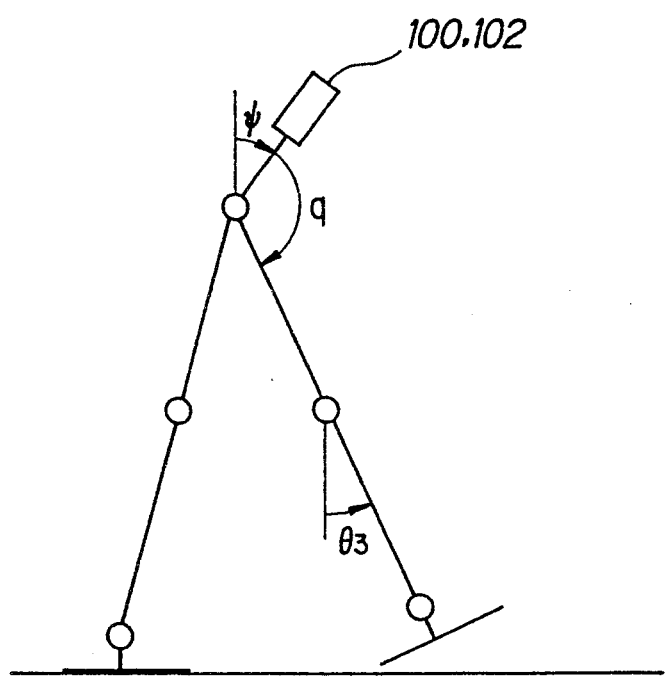
FIG. 18 is an explanatory view showing calculation of angles or angular velocities of the robot joints carried out in FIG. 17 flowchart.

Next, in step S302, the outputs of the inclination angle sensors 100 and 102 are read in. The detection values produced by these sensors indicate angular velocities. The encoder outputs are read in in the following step S304. These outputs indicate the relative angles of the respective joints. The procedure then moves to step S306 in which the detection values from the inclination angle sensors are integrated for conversion into angles (absolute angles). What this means in concrete terms is illustrated in FIG. 18. The output value of a sensor with respect to the z-axis (the absolute angle) is combined with the output value of an encoder (relative angle) for calculating the angle (angular velocity) of the joint concerned. For example, where the absolute angle of the free leg is 83 and corresponding angular velocity is $\theta 3$, it follows that $$\theta 3 = \pi - (\phi + q)$$

$$\dot{\theta}_3 = -\dot{\phi} - \dot{q}$$

where $\phi$ is the output of the inclination sensor representing the absolute angle of the upper body linkage and q is the relative angle between the linkages. In other words, the angle of inclination (velocity) with respect to the absolute coordinates of the body (upper body) linkage is first detected and then the angle of inclination (velocity) of the leg linkage with respect to the absolute coordinates is obtained from the relative angle (velocity) of the leg linkage with respect to the upper body linkage. (In obtaining the relative angular velocities from the encoder outputs, the one-stage difference per prescribed period of time is used.)

The procedure then moves to step S308 in which it is discriminated whether the respective target and actual linkage angles coincide and if it is found that the actual posture differs from the target posture, the procedure goes to step S310 in which the joint torques are calculated in accordance with the stability control referred to earlier. Taking as an example the case where the target posture is the right leg support target posture output in step S12 of the flowchart of FIG. 7, torque value calculations are carried out using Eq. (4) for realizing the relationship according the Eq. (5). Specifically, the subsystem 2 calculates the joint torques for the pitch direction, namely for the right ankle joint 18R and the hip joints 12R and 12L, and the subsystem 3 calculates the joint torques for the roll direction, namely for the right ankle joint 20R and the hip joints 14R and 14L. So as to effectively enhance the convergence of the actual angles on the target angles at this time, an appropriate feedback gain Fp is set with respect to the angles and an appropriate feedback gain Fv is set with respect to the angular velocities. Further, in determining the control values, these values are assigned higher priority in the order of increasing contribution to stability during walking over the terrain being traversed. For flat ground walking, the values are determined in the order of that for the supporting leg ankle, the supporting leg hip joint and the free leg hip joint. (For step climbing this order would become supporting leg ankle, supporting leg knee, supporting leg hip joint and free leg hip joint.) Establishing such a priority makes it possible to determine at least the torque of the supporting leg ankle even when, for example, the amount of time for conducting the control is insufficient. Moreover, since the free leg has to move faster than the supporting leg during walking, the response rate of the feedback gain is adjusted to increase in the order of that for the supporting leg linkages, the upper body linkage and the free leg linkages.

In the following step S312 the determined joint torque values are converted into motor current values which are output to the servo amplifiers 126 in step S314 for driving the motor 74 etc. The same procedures are thereafter repeated until it is found in step S308 that the target and actual values coincide.

Figure 19:
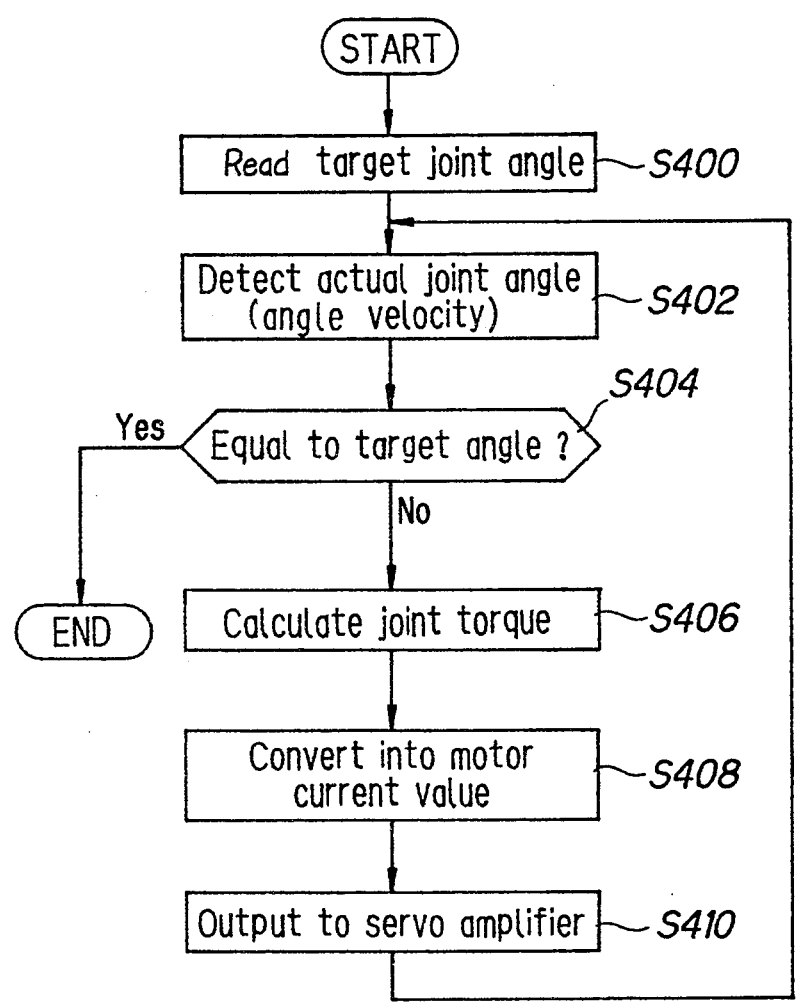
FIG. 19 is a flowchart showing the operation of the subsystem 4 illustrated in FIG. 11.

The local control conducted by the subsystem 4 will now be explained with reference to the flowchart of FIG. 19.

The procedure begins at step S400 in which the target joint angle output in the flowchart of FIG. 7 is read in and then advances to step S402 in which the actual joint angle (relative angle) and joint angular velocity are detected. As was mentioned earlier, relative angles (relative angular velocities) are used in local control since even if the absolute angles (angular velocities) of the knee etc. of the free leg should be detected, they would thereafter change with movement of the hip joint(s).

In the following step S404 it is discriminated whether or not the actual joint angle coincides with the target joint angle and if they does not, the procedure moves to step S406 in which Eq. (4)" is used for calculating the joint torque. Then in the following steps S408–S410, the calculated value is converted to electric current value which is supplied to the motor 85 etc. The same procedures are thereafter repeated until it is found in step S404 that the target and actual values coincide.

Figures 20A, 20B, 20C:
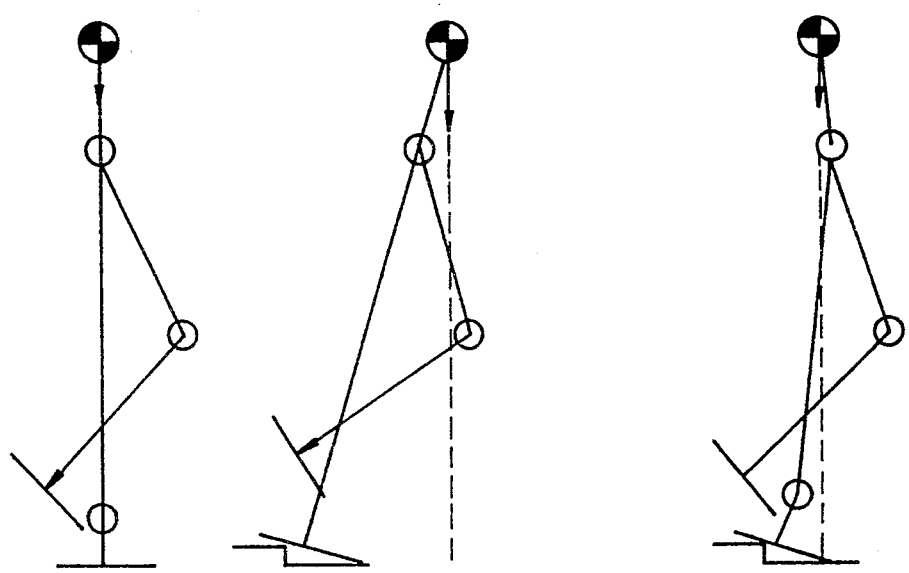
FIG. 20(a)(b)(c) are explanatory views showing examples of places where the robot walks and illustrating how to correct unstable posture when the robot tends to fall over on rough ground.

In this embodiment the linkage angles are found with respect to the absolute coordinates and stability control is then conducted on the basis of the obtained values. The significance of this will be understood from FIG. 20, which shows how stable walking control can be constantly realized not only in the case of walking over level ground (FIG. 20(a)) but also in the case of walking over rough ground (FIG. 20(b)). Namely, if the posture should become unstable in the course of walking over an uneven terrain, the posture angles can be immediately corrected on the basis of the detected absolute linkage angles (angular velocities), as shown in FIG. 20(c). Thus, the system is constituted to carry out feedback control for eliminating the deviation between target value and the detected angle or angular velocity of inclination of the linkage mechanism in the absolute coordinate system, and stable dynamic walking can be ensured at all times even during locomotion over rough terrain.

Moreover in stability control, the number of joints with respect to which control is conducted is reduced to the minimum required and control is conducted separately but in coordination with respect to pitch and roll, while the remaining joints are subjected local control. As a result, the control is considerably simplified.

In addition, feedback control is conducted with respect to the velocity components so as to realize the desired posture angles and the feedback gain is adjusted so as to achieve the response speed required by the individual linkages. This further enhances the capability of the robot to walk stably at high speed.

Figure 21:
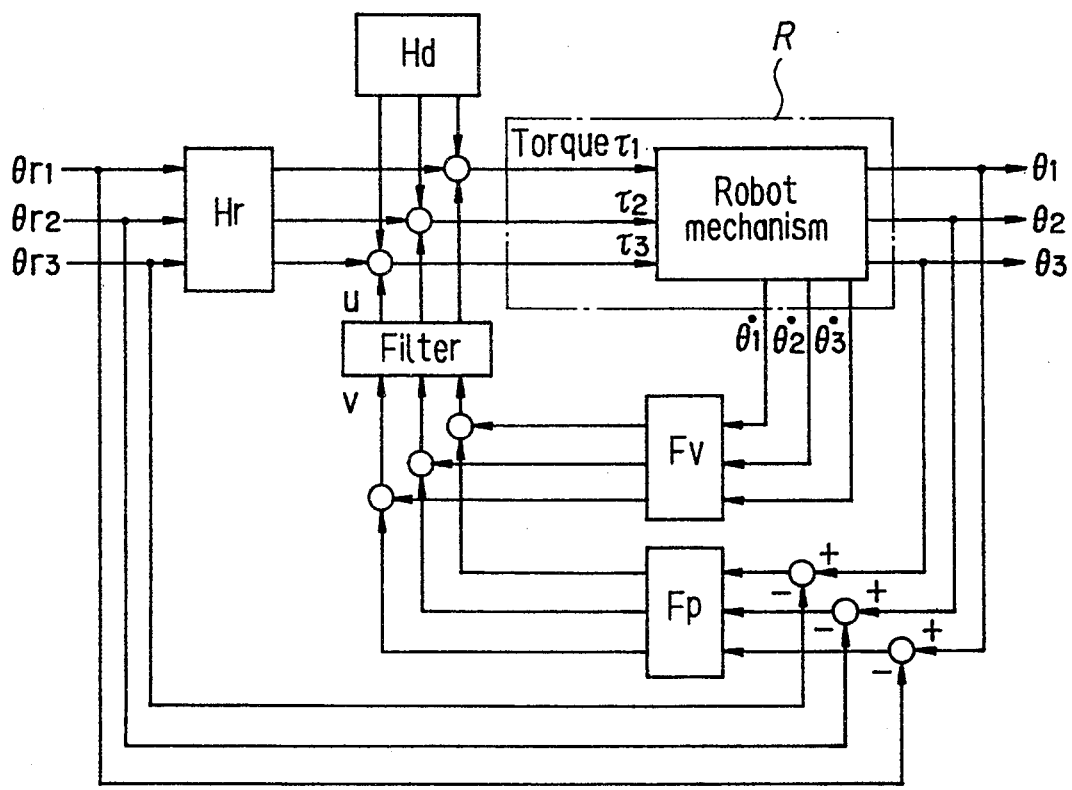
FIG. 21 is a block diagram similar to FIG. 10, but shows the second embodiment of the present invention.
Figure 22:
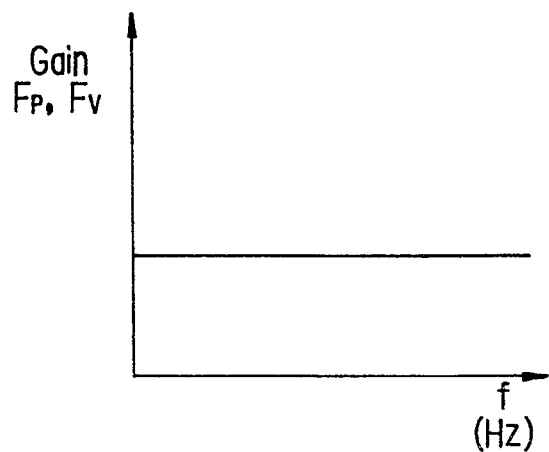
FIG. 22 is a graph illustrating feedback gain used in the first embodiment.
Figure 23:
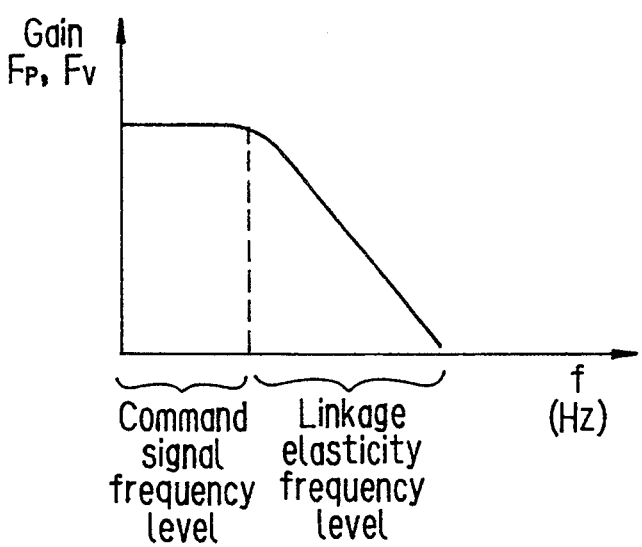
FIG. 23 is a graph illustrating feedback gain used in the second embodiment which is varied with respect to frequency.

A second embodiment of the invention is shown in the block diagram of FIG. 21. In this embodiment, the aforesaid gain is imparted with frequency characteristics. In contrast from the case of the first embodiment in which the gain remains constant regardless of the frequency (as shown in FIG. 22), in the second embodiment the gain decreases with increasing frequency (as shown in FIG. 23).

This is advantageous in view of the fact that the linkage response speed has to be increased for higher walking speeds. Specifically, the feedback gain has to be increased. It is also necessary to improve stability against disturbances from the exterior, and for this, to speed up the system response by increasing the gain. However, increasing the gain for enhancing the linkage response gives rise to high frequency vibration in the linkages and when the gain is further increased, this high frequency vibration comes to be amplified in the feedback loops, which is apt to result in system chattering. This occurs because the mathematical model expressed by Eq. (1) is valid only in the low frequency range of a rigid model and cannot accurately account for phenomena occurring at high frequencies where the effects of the linkage flexibility, play, bending and the like become prominent.

It is, however, extremely difficult to devise a mathematical model accurately reflecting all states up to the high frequency range. Even if such a model could be created, it would be very complex and any control system based thereon would require the use of a computer of such high performance and cost as to make the system unusable in practical applications.

Since the cause of the chattering is that the high frequency signals do not attenuate but, to the contrary, are amplified, the solution is to attenuate them. Thus in the present embodiment the feedback gains Fp and Fv are imparted with frequency characteristics. As shown in FIG. 23, the gain is made relatively large in the low frequency range corresponding to the command signal level but is made low in the high frequency range in which the effect of linkage elasticity manifests itself. This is accomplished in the actual system by inserting a high frequency cut filter in the feedback loop. The state equation of this filter is $$\dot{Z} = AFz + Bfv$$

$$u = Crz$$

where z is the state variable of the filter (3-input, 3-output). The cut-off frequency can be determined as desired at the design stage by appropriately selecting the values of Af, Bf and Cf. In the present embodiment, at the time of calculating the torque value in step S310 of FIG. 17, the cut-off frequency is varied in proportion to, for example, the velocity of the free leg so as to maintain it higher than the response frequency of the free leg at all times. Alternatively, the cut-off frequency is varied in proportion to a walking period or gait. Further, since any payload attached to the upper body of the robot will change the natural frequency of the robot mechanisms and this will in turn change the vibration frequency, it suffices to vary the cut-off frequency in proportion to the payload. This will enable the walking speed to be increased to the maximum possible without producing vibration. This adjustment can be achieved either by means of software or by use of an electric filter.

Since this embodiment reduces the feedback gain in the high frequency region, it enables the walking cycle and the drive velocity to be increased to the maximum within the range in which vibration owing to the elasticity of the joint linkages does not occur. It thus makes it possible to realize rapid walking with higher stability.

Figure 24:
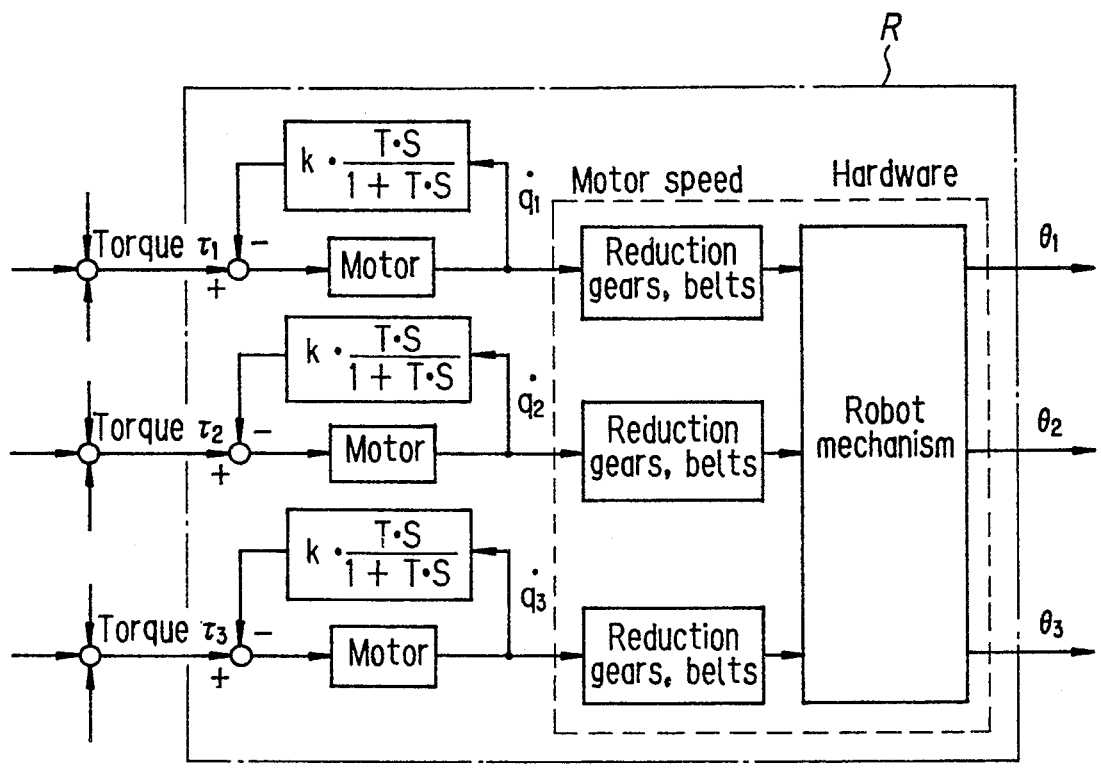
FIG. 24 is an explanatory block diagram showing the third embodiment according to the present invention.

A third embodiment of the invention is shown in the block diagram of FIG. 24.

A method of coping with vibration attributable to low linkage rigidity was discussed above in connection with the second embodiment. The fact is, however, that vibration also occurs as a result of nonlinear factors such as play and flexing in the reduction gears, belts and the like. This is presumed to result from the fact that the mechanical play etc. prevent feedback of minute amounts of motor rotation by preventing their effect from appearing in the linkages.

One conceivable way of coping with this problem would be to suppress vibration by imparting viscous resistance to the motor shafts. This could be achieved by applying so-called servo system speed feedback in which the product obtained by multiplying the rotational speed q of the motor of each joint by a constant k (k being a viscosity coefficient) and feeding the resulting product back to the torque command value. However, the viscous resistance produced in the motors by this method would dull the response of the linkages and become an impediment to high-speed walking.

Figure 25:
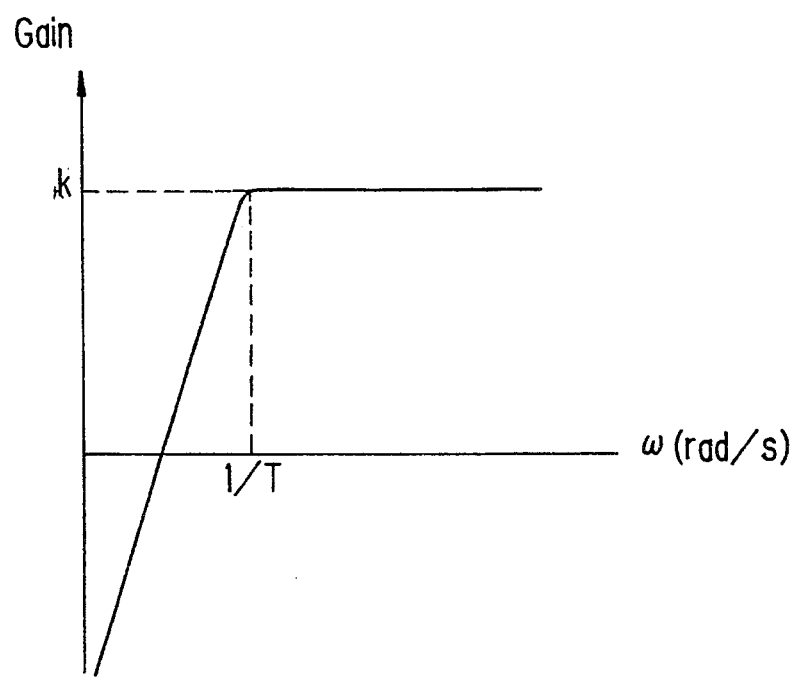
FIG. 25 is a graph illustrating feedback gain of high pass filter used in the third embodiment.

The present embodiment therefore copes with the problem by a method which capitalizes on the fact that the vibration occurs in a frequency range that is higher than the walking cycle. As shown specifically in FIG. 24 (which corresponds to the portion R enclosed by a single dot chain line in FIG. 21), the motor rotation speed $\dot{q}n$ is fed back through a high pass filter and the value which passes through the filter range is multiplied by a coefficient k. The filter gain characteristics are shown in FIG. 25.

With this arrangement no viscous resistance is produced so long as the rate of motor speed variation is on a low order similar to that of the walking cycle. However, when the rate of speed variation is large as in the case of vibration, the viscous resistance becomes large so that the linkage response speed decreases and the vibration can be effectively suppressed.

Figure 26:
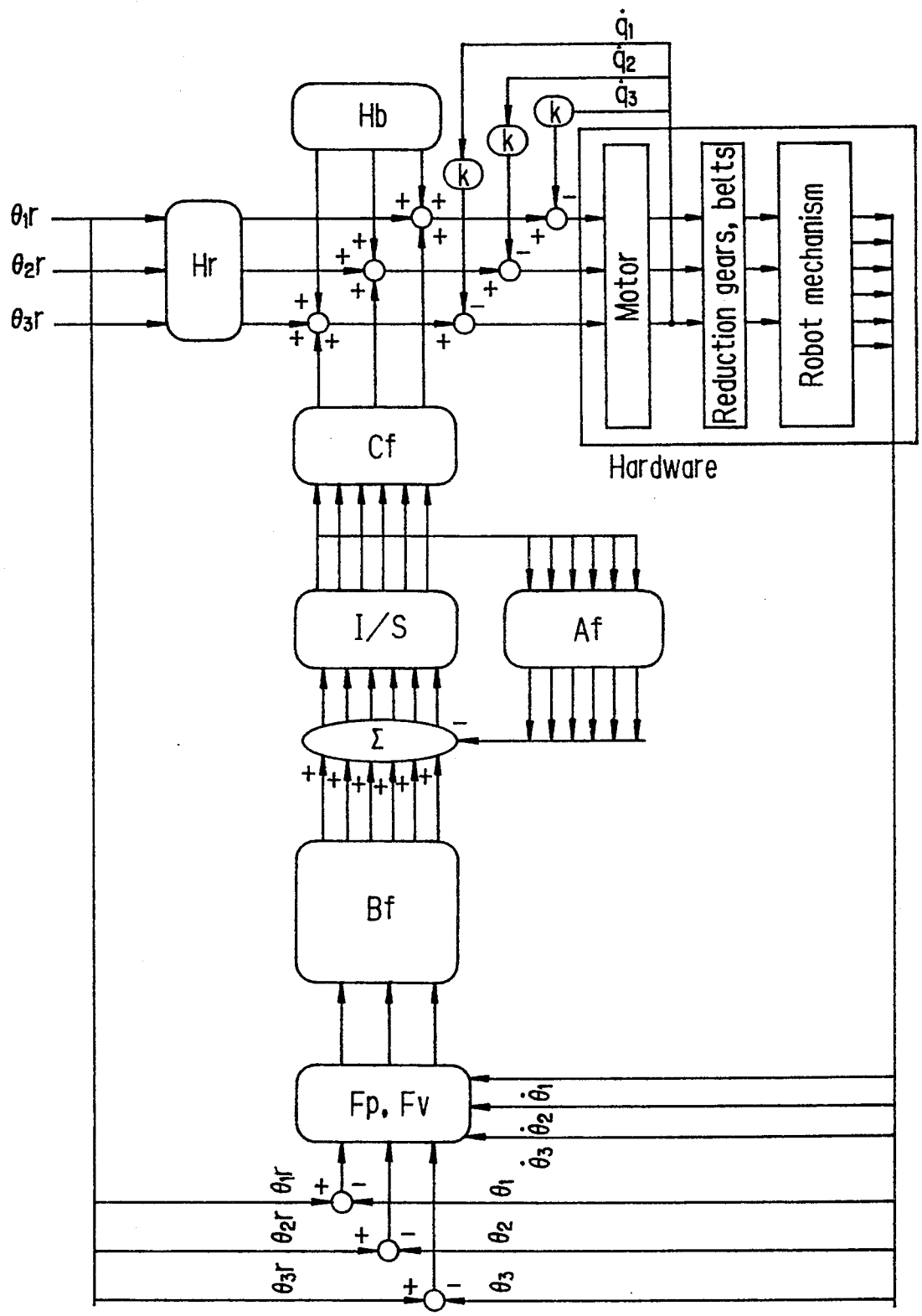
FIG. 26 is an explanatory block diagram similar to FIG. 24 but shows the fourth embodiment according to the present invention.

A fourth embodiment of the invention is shown in the block diagram of FIG. 26.

A model modified to reflect the viscous resistance imparted the motors in the foregoing manner can be obtained by rewriting Eq. (3) as $$\ddot{\theta} = K\dot{\theta} + A\theta + B\dot{\theta} + D \tag{3}'$$

Where the state feedback of Eq. (4) is conducted with respect to this equation, Eq. (5) becomes $$\ddot{\theta} + (BFv - K)\dot{\theta} + (A - BFp)(\theta r - \theta) = 0 \tag{5}'$$

FIG. 26 explains this diagrammatically. By resetting Fv and Fp so as to exhibit similar response, vibration due to play etc. in the linkage can be effectively suppressed without dulling of the response owing to viscosity.

It should be noted that while ordinary mechanical viscous resistance consumes energy and is not appropriate for use in a walking robot, the viscous resistance in the present embodiment and the third embodiment described above is produced by use of software and, as such, it involves no problem of energy consumption. Specifically, since the speed is detected, the detected value is multiplied by a coefficient using a software technique, and the resulting product is fed back to the torque (current) command, no energy is consumed. (While software techniques are employed in this and the third embodiment, it is alternatively possible to use electric circuits and, further, in the case of the third embodiment, to use a mechanical filter means.)

Although the invention has been explained with respect to embodiments of a biped walking robot, the invention is not limited in application to biped robots but can also be applied to robots with only one leg or with three or more legs.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling locomotion of a legged walking robot having a linkage including a body link and two articulated leg linkages each connected to the body link through a hip drive joint and each having a thigh link and a crus link connected by a knee drive joint and a foot connected to the crus link by an ankle drive joint, comprising:

servo motors for driving the drive joints of the robot;

first means for detecting at least one of absolute angle and angular velocity of the body link relative to the gravitational direction;

second means for detecting at least one of relative angles and angular velocities between the links;

third means for determining, based on a predetermined walking pattern, a target posture of the robot in terms of at least one of target angles and angular velocities of the links, relative to the gravitational direction using at least one of the detected absolute angle and angular velocity of the body link and relative angles and angular velocities of the drive joints;

fourth means for determining a deviation between at least one of the target and actual link angles and angular velocities of the robot; and control means for determining control values of the servo motors, for decreasing the deviation.

2. A system according to claim 1, wherein said control means determines the control values in terms of torque in response to the deviation.

3. A system according to claim 1, further including fifth means for discriminating which leg linkage is supporting the robot weight such that the control means detects the motion state of the leg linkages to determine the control values comprising a first feedback control value for at least one of the drive joints of the supporting leg linkage based on a preestablished state equation and a second feedback control value for at least one of the drive joints of the free leg linkage.

4. A system according to claim 3, wherein said control means determines the first feedback control value by detecting the motion state of the support leg linkage through at least one of the absolute angle and angular velocity.

5. A system according to claim 3, wherein said control means determines the second feedback control value detecting the motion state of the free leg linkage through at least one of the relative angle and angular velocity.

6. A system according to claim 3, wherein said control means determines at least one of the first and second feedback control values in the order of the ankle drive joint of the supporting leg linkage, the hip drive joint of the supporting leg linkage and the hip drive joint of the free leg linkage.

7. A system according to claim 3, wherein the second feedback control value of the free leg linkage is not changed until the free leg linkage has landed on the ground.

8. A system according to claim 3, wherein the second feedback control value is made constant at the time when the free leg linkage has landed on the ground.

9. A system according to claim 3, wherein said control means determines feedback gain of the first and second feedback control values for the hip and ankle drive joints such that the response speed of the drive joints increases in the order of the supporting leg linkage, the body link, and the free leg linkage.

10. A system according to claim 3, further comprising means for detecting a load on a leg linkage to determine landing or lifting of the leg.

11. A system according to claim 3, further comprising a limiter for limiting the first feedback control value for the ankle drive joint of the supporting leg linkage to a maximum.

12. A system according to claim 11, wherein the maximum is made different in the case when the free leg linkage lands on the ground and in the case when the supporting leg linkage lifts from the ground.

13. A system according to claim 3, wherein the feedback gain of at least one of the first feedback control value and the second feedback control value is varied with respect to the frequency of the feedback signal such that the gain in the frequency above a reference frequency is smaller than that below the reference frequency.

14. A system according to claim 13, wherein the reference frequency is greater than the response frequency of the free leg linkage.

15. A system according to claim 13, wherein the reference frequency is varied with at least one of the gait or payload on the robot.

16. A system according to claim 3, wherein outputs of the servo motors which drive the drive joints are fed back to the first feedback control value such that viscous resistance is produced in the servo motor outputs.

17. A system according to claim 16 further comprising a high pass filter for carrying out feedback at a frequency above a predetermined frequency.

18. A system according to claim 16, wherein said viscous resistance is produced by use of a software filter.

19. A system according to claim 1, wherein at least one of the absolute angle and angular velocity of the leg linkage is obtained through the absolute angle and angular velocity of the body link and the relative angle and angular velocity of the leg linkage with respect to the body link.

20. A system according to claim 1, wherein the drive joints are separated into groups and are separately controlled in the groups while being coordinated with each other.

21. A system according to claim 20, wherein the drive joints are separated into first groups for use in the motion in the pitch direction and into second groups for use in the motion in the roll direction.

* * * * *